(12) United States Patent
Mayle

(10) Patent No.: US 7,810,537 B2
(45) Date of Patent: *Oct. 12, 2010

(54) APPARATUS AND METHOD FOR SEALING A VERTICAL PROTRUSION ON A ROOF

(76) Inventor: Steven R. Mayle, 2274 August Dr., Fremont, OH (US) 43420

( * ) Notice: Subject to any disclaimer, the term of this patent is extended or adjusted under 35 U.S.C. 154(b) by 0 days.

This patent is subject to a terminal disclaimer.

(21) Appl. No.: 11/940,560

(22) Filed: Nov. 15, 2007

(65) Prior Publication Data

US 2008/0085336 A1    Apr. 10, 2008

Related U.S. Application Data

(60) Continuation of application No. 10/125,674, filed on Apr. 18, 2002, now abandoned, and a division of application No. 11/129,914, filed on May 16, 2005, now Pat. No. 7,387,149, which is a continuation of application No. 10/374,688, filed on Feb. 26, 2003, now Pat. No. 6,892,782, which is a continuation of application No. 10/124,931, filed on Apr. 18, 2002, now Pat. No. 6,892,499.

(60) Provisional application No. 60/353,251, filed on Feb. 1, 2002.

(51) Int. Cl.
*B32B 37/00* (2006.01)
(52) U.S. Cl. .................. 156/497; 156/579; 156/581; 156/583.1
(58) Field of Classification Search .................. 156/82, 156/497, 499, 538, 539, 540, 556, 580, 581, 156/583.1, 579; 100/315, 212, 295
See application file for complete search history.

(56) References Cited

U.S. PATENT DOCUMENTS

| 322,153 | A | 7/1885 | Blair et al. |
| 549,352 | A | 11/1895 | Folger |
| 821,426 | A | 5/1906 | Meyer |
| 835,889 | A | 11/1906 | Moeller |
| 1,012,219 | A | 12/1911 | Overton |
| 1,031,577 | A | 7/1912 | Overton |
| 1,080,159 | A | 12/1913 | Overton |

(Continued)

FOREIGN PATENT DOCUMENTS

CH        221530        6/1942

(Continued)

OTHER PUBLICATIONS

GenFlex Product Details for Field Fabricated Outside Corner.

(Continued)

*Primary Examiner*—James Sells
(74) *Attorney, Agent, or Firm*—Standley Law Group LLP

(57) ABSTRACT

A device forms a radial flange on a bottom opening of a conate member having a longitudinal axis. The device has a die for receiving the conate member with the bottom opening extending from an open end of the die, a seal-forming cone having at least two radially-extendable sections and being removably located in the open end of the die, inside the conate member, and a handle, axially movable in the cone to extend the movable sections.

17 Claims, 29 Drawing Sheets

U.S. PATENT DOCUMENTS

| | | | |
|---|---|---|---|
| 1,103,666 A | 7/1914 | Fife | |
| 1,163,034 A | 12/1915 | Phippen | |
| 1,195,338 A | 8/1916 | Churchill | |
| 1,202,687 A | 10/1916 | Elkerton | |
| 1,540,192 A | 6/1925 | Smith | |
| 1,594,932 A | 8/1926 | Doyle | |
| 1,678,715 A | 7/1928 | Stephenson | |
| 1,721,715 A | 7/1929 | Schindler | |
| 1,923,220 A | 8/1933 | Lightbown | |
| 2,069,289 A | 2/1937 | Swendsen et al. | |
| 2,151,794 A | 3/1939 | Peebles | |
| 2,176,344 A | 10/1939 | Hunt | |
| 2,256,313 A | 9/1941 | Dexter | |
| 3,030,903 A * | 4/1962 | Morris | 269/48.1 |
| 3,040,154 A | 6/1962 | Marsh | |
| 3,054,222 A | 9/1962 | Buckner | |
| 3,325,953 A | 6/1967 | Alleaume | |
| 3,446,685 A | 5/1969 | Goldstone et al. | |
| 3,446,688 A | 5/1969 | Flax | |
| 3,451,178 A | 6/1969 | Beale | |
| 3,566,562 A | 3/1971 | White | |
| 3,763,605 A | 10/1973 | Freeman | |
| 3,871,145 A | 3/1975 | Hatmaker | |
| 3,887,323 A | 6/1975 | Bratten | |
| 3,890,754 A | 6/1975 | Spurdle | |
| 3,894,376 A | 7/1975 | Shearer | |
| 3,942,295 A | 3/1976 | Schacht | |
| 4,049,034 A | 9/1977 | Vcelka et al. | |
| 4,053,346 A * | 10/1977 | Amberg et al. | 156/446 |
| 4,112,632 A | 9/1978 | Simpson | |
| 4,115,961 A | 9/1978 | Bishop | |
| 4,120,129 A | 10/1978 | Nagler et al. | |
| 4,162,597 A | 7/1979 | Kelly | |
| 4,192,116 A | 3/1980 | Kelly | |
| 4,217,742 A | 8/1980 | Evans | |
| 4,223,486 A | 9/1980 | Kelly | |
| 4,226,069 A | 10/1980 | Hinds | |
| 4,265,058 A | 5/1981 | Logsdon | |
| 4,302,275 A | 11/1981 | Burmeister et al. | |
| 4,335,546 A | 6/1982 | Kelly | |
| 4,351,140 A | 9/1982 | Simpson | |
| 4,374,695 A | 2/1983 | Ikeda et al. | |
| 4,382,353 A | 5/1983 | Kelly | |
| 4,386,488 A | 6/1983 | Gibbs | |
| 4,389,826 A | 6/1983 | Kelly | |
| 4,419,067 A | 12/1983 | Graafmann | |
| 4,441,295 A | 4/1984 | Kelly | |
| 4,446,665 A | 5/1984 | Berger | |
| 4,449,336 A | 5/1984 | Kelly | |
| 4,493,175 A | 1/1985 | Coppola, Jr. | |
| 4,496,410 A | 1/1985 | Davis et al. | |
| 4,514,242 A * | 4/1985 | MacLaughlin et al. | 156/73.5 |
| 4,544,593 A | 10/1985 | Borgert et al. | |
| 4,555,296 A | 11/1985 | Burtch et al. | |
| 4,557,081 A | 12/1985 | Kelly | |
| 4,603,517 A | 8/1986 | Lyons, Jr. | |
| 4,625,469 A | 12/1986 | Gentry et al. | |
| 4,635,409 A | 1/1987 | Vandemore | |
| 4,642,950 A | 2/1987 | Kelly | |
| 4,652,321 A | 3/1987 | Greko | |
| 4,668,315 A | 5/1987 | Brady et al. | |
| 4,671,036 A | 6/1987 | Sullivan | |
| 4,688,361 A | 8/1987 | Kelly | |
| 4,700,512 A | 10/1987 | Laska | |
| 4,712,348 A | 12/1987 | Triplett et al. | |
| 4,718,211 A | 1/1988 | Russell et al. | |
| 4,726,164 A | 2/1988 | Reinwall et al. | |
| 4,736,562 A | 4/1988 | Kelly | |
| 4,799,986 A | 1/1989 | Janni | |
| 4,834,828 A | 5/1989 | Murphy | |
| 4,848,045 A | 7/1989 | Nichols et al. | |
| 4,860,514 A | 8/1989 | Kelly | |
| 4,870,796 A | 10/1989 | Hart et al. | |
| 4,872,296 A | 10/1989 | Janni | |
| 4,888,930 A | 12/1989 | Kelly | |
| 4,894,104 A * | 1/1990 | Hemus | 53/491 |
| 4,909,135 A | 3/1990 | Greko | |
| 4,947,614 A | 8/1990 | Mayle | |
| 4,963,219 A | 10/1990 | Nichols et al. | |
| 5,014,486 A | 5/1991 | Mayle | |
| 5,027,572 A | 7/1991 | Purcell et al. | |
| 5,031,374 A | 7/1991 | Batch et al. | |
| 5,065,553 A | 11/1991 | Magid | |
| 5,077,943 A | 1/1992 | McGady | |
| 5,097,582 A * | 3/1992 | Kreher et al. | 29/283.5 |
| 5,145,617 A | 9/1992 | Hermanson et al. | |
| 5,197,252 A | 3/1993 | Tiscareno | |
| 5,218,793 A | 6/1993 | Ball | |
| 5,365,709 A | 11/1994 | Lassiter | |
| 5,452,553 A | 9/1995 | Clapp et al. | |
| 5,570,553 A | 11/1996 | Balkins | |
| 5,586,414 A | 12/1996 | Tawzer | |
| 5,605,019 A | 2/1997 | Maziekien et al. | |
| 5,706,610 A | 1/1998 | Mayle | |
| 5,740,647 A | 4/1998 | Kelly | |
| 5,775,052 A | 7/1998 | Mayle | |
| 5,829,214 A | 11/1998 | Hart | |
| 5,850,719 A | 12/1998 | Mayle | |
| 5,930,969 A | 8/1999 | Mayle et al. | |
| 5,935,357 A | 8/1999 | Hubbard et al. | |
| 5,983,592 A | 11/1999 | Mayle | |
| 6,004,645 A | 12/1999 | Hubbard | |
| 6,021,616 A | 2/2000 | Mayle | |
| 6,110,311 A | 8/2000 | Mayle et al. | |
| 6,187,122 B1 | 2/2001 | Hubbard et al. | |
| 6,199,326 B1 | 3/2001 | Mayle | |
| 6,205,730 B1 | 3/2001 | Hasan et al. | |
| 6,250,034 B1 | 6/2001 | Hulsey | |
| 6,892,782 B1 * | 5/2005 | Mayle | 156/581 |
| 7,387,149 B1 * | 6/2008 | Mayle | 156/497 |

FOREIGN PATENT DOCUMENTS

| | | |
|---|---|---|
| DE | 3321101 | 12/1983 |
| GB | 1 310 003 | 1/1971 |
| GB | 1 355 517 | 5/1971 |
| GB | 1 511 729 | 10/1975 |
| JP | 49-002675 | 1/1974 |

OTHER PUBLICATIONS

Technical product literature from Duro-Last, Inc.
GenFlex Roofing Systems, pp. 17 and 21, Apr. 2001, see: http://222.genflex.com.
General Tire Building Products Company, The General Tire and Rubber Company, Field Fabricated Pipe Boot, Jun. 1, 1983.
GTR Building Products Company, The General Tire and Rubber Company, GenSeal ACR Roofing System Roof Pipe Penetration.
Prior Art picture, Duro-Last stack with lap weld.
Prior Art picture, Duro-Last stack with buH weld.
Prior Art picture, Duro-Last corner.
Prior Art picture, Custom Seal corner piece.
Alkor Single Ply Roofing Systems brochure.
At Last Roofing, Inc. catalog with technical product literature and detail drawings, 1986.
Benoit E.P.D.M. Roofing Systems brochure.
Bond Cote Roofing Systems detail drawings 7-5.1, 7-6, 7-6.1 and 7-9, Jul. 1988.
Custom Seal detail drawings #1 through #41.
Duro-Last detail drawings 7.10 and 7.11, Jun. 1983.
Duro-Last Roofing, Inc., The Complete Roofing System, product overview with sample advertisements.
Duro-Last Roofing, Inc. Factory Mutual System Manual, technical product literature and drawings, approximately from the mid-1980's.

Duro-Last Roofing, Inc. information manual with technical product literature and drawings, approximately from 1991-1994.
Duro-Last Roofing, Inc. information manual with technical product literature, drawings, and pictures.
Duro-Last Roofing, Inc. manual with product detail and literature, Jan. 1, 1992 edition.
GAF Roofing Products brochure, 1983.
Gates Engineering Single Ply Elastomeric Sheet Roofing Systems brochure.
GenFlex Roofing Systems detail drawings 1.02-1.06, 2.02-2.04, 3.01, 3.03-3.09, 4.03, 5.03, 6.02, 7.01-7.03, 8.02-8.03, 10.01-10.02, 11.01-11.03, 14.07-14.08, 16.01-16.03, 18.02, 19.04-19.06, 90.00-90.01, 91.04, 91.07-91.09, 1994.
General Tire All Climate Roofing Systems brochure, 1982.
General Tire Building and Products Company, The General Tire and Rubber Company, Field Fabricated Pipe Boot spec sheet F-3.01, Jun. 1, 1983.
GTR Building and Products Company, The General Tire and Rubber Company, GenSeal ACR Roofing System Roof Pipe Penetration spec sheet.
GTR Building and Products Company, The General Tire and Rubber Company, Prefabricated Pipe Boot spec sheet F-3.03, Jun. 1, 1984.
I.p.w. Interplastic Interoof Roofing Systems brochure.
Johns-Manville Manual for Built-Up Roof Systems brochure, 1983.

J.P. Stevens Hi-Tuff single-ply membrane roofing system brochure.
Koppers The Roofing People brochure.
Mayle, Steve. Side elevational view of Custom Seal's corner piece fig. 7.
Mule-Hide Products Co., Inc. detail drawings MH-112 and MH-121, Feb. 1, 1993.
Owens-Corning Fiberglass PermaPly-R brochure, 1982.
Polyken Roofing Systems brochure.
Rubber & Plastics Compound Company, Inc. Single Ply Membrane Roofing brochure.
Sarnafil detail drawings 5.1-5.3, 1984.
Sarnafil Roofing Membranes brochure.
Seal-Dry/USA, inc. detail drawings 7.1, 7.2, 10.1, FA-410-FA-413, FA-604, FA-701, EQ-305-EQ-308, EQ-601-EQ-602, Jun. 1, 1994.
Seaman Corporation, Fiberlite Single Ply Roof, field fabricated pipe flashing drawing FTR-D19, Oct. 1986.
Seaman Corporation, Fiberlite Single Ply Roof, pre-formed pipe flashing drawing FTR-DP3, Jan. 1, 1996.
Siplast brochure.
Tamko Built-Up Roofing Systems brochure, 1983.
Trocal Roofing Systems brochure.
WeatherGard Single Ply Elastomeric Roofing Systems brochure.

* cited by examiner

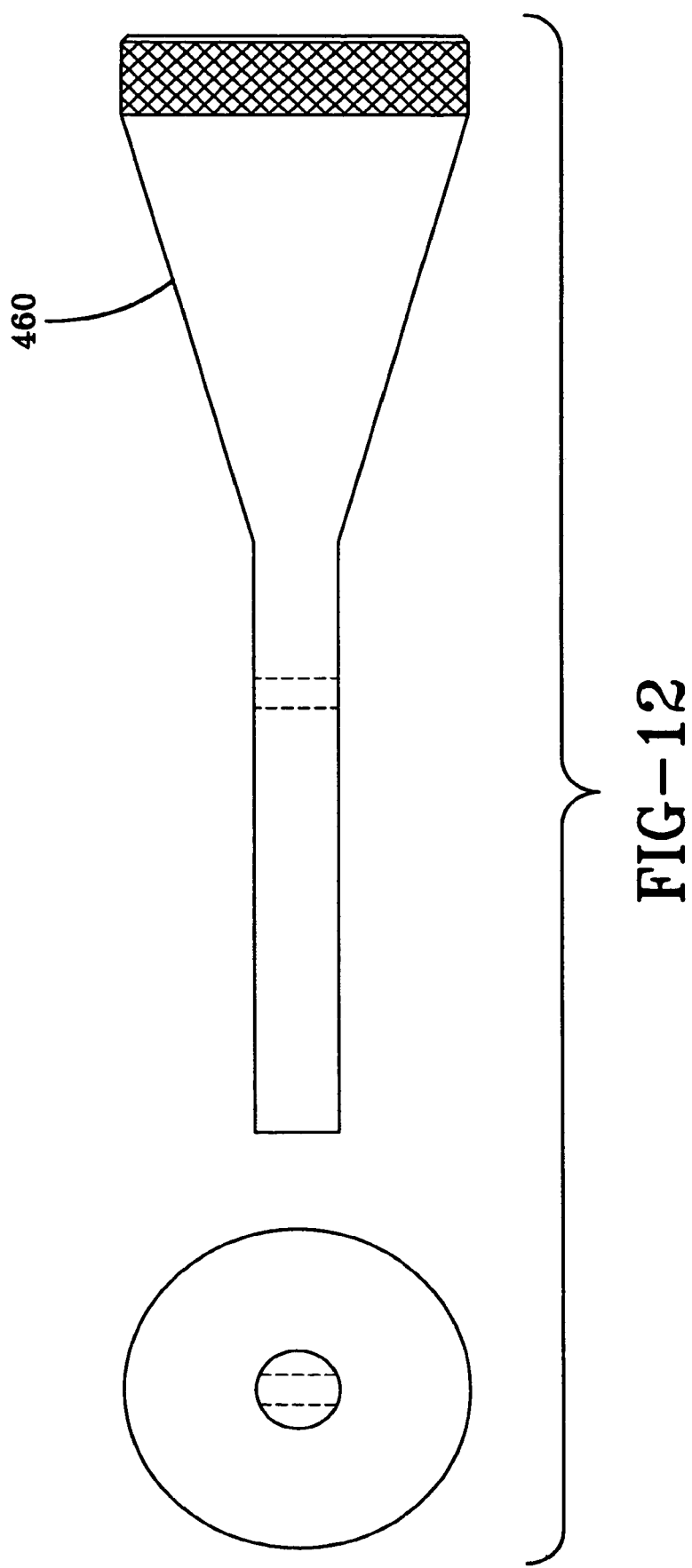

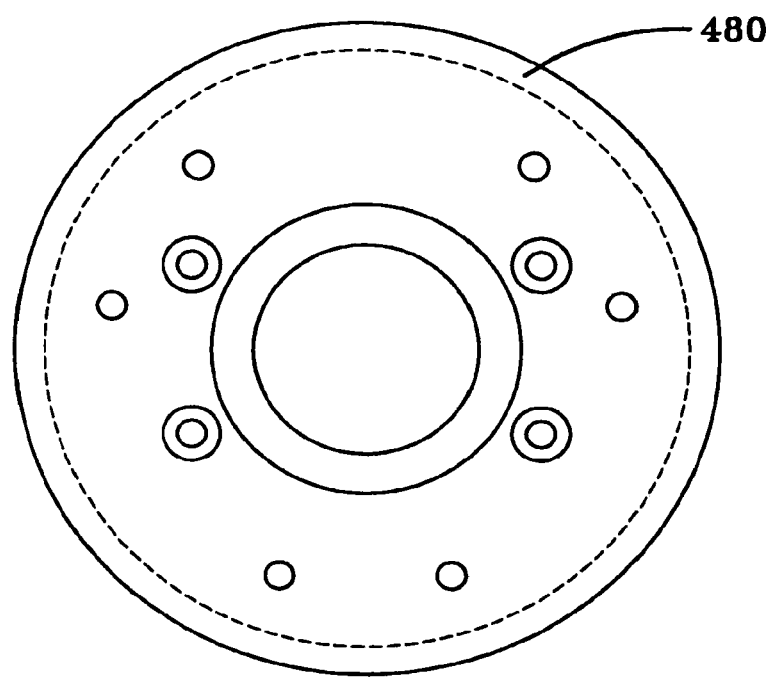
FIG-13a
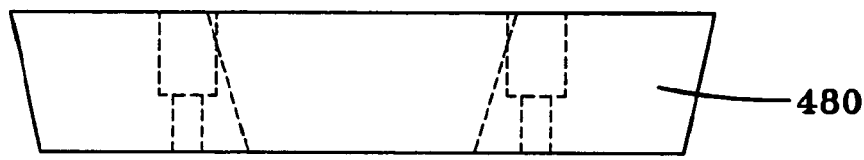
FIG-13b
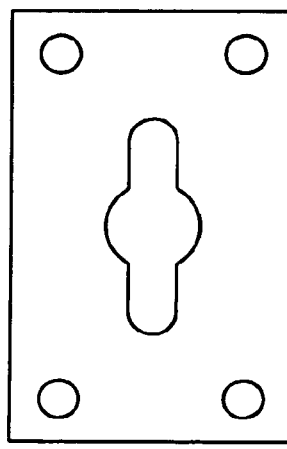 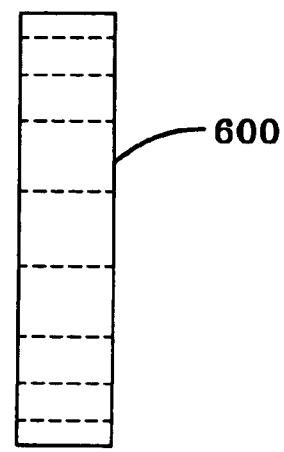
FIG-14a  FIG-14b

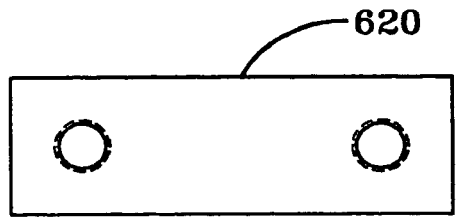
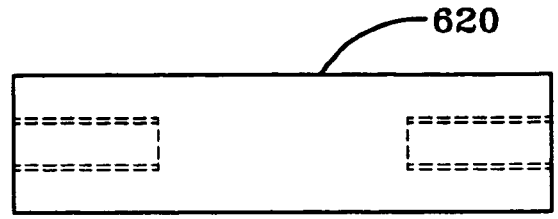
FIG-15a  FIG-15b
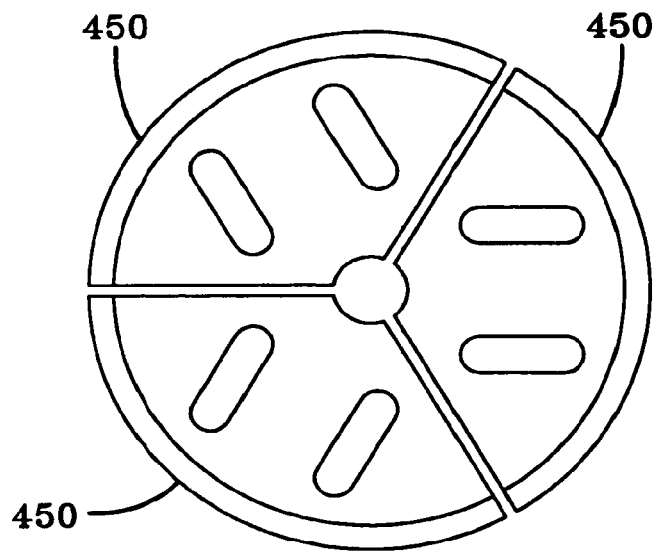
FIG-16a  FIG-16b

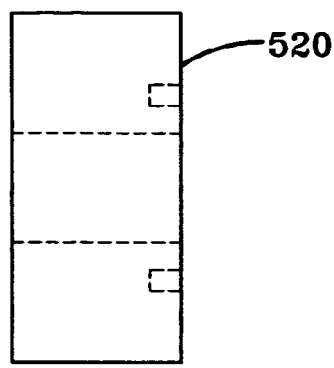 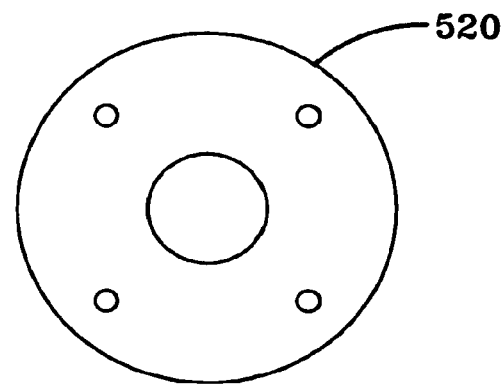
FIG-19c       FIG-19d
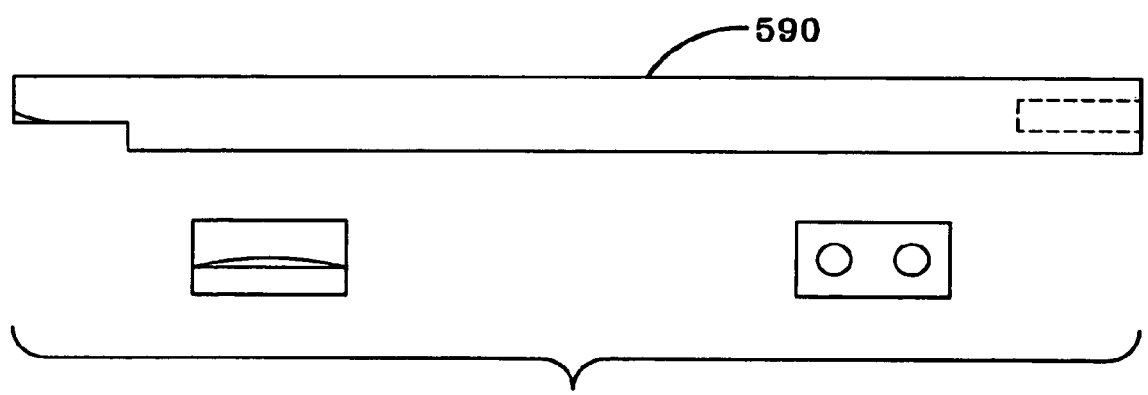
FIG-19e

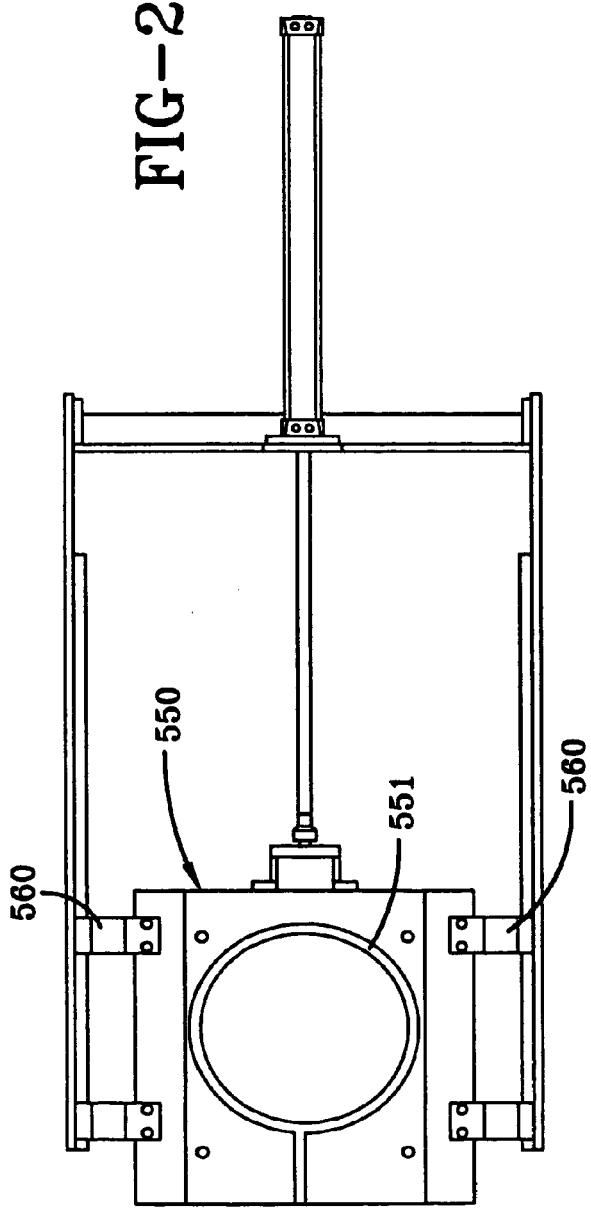
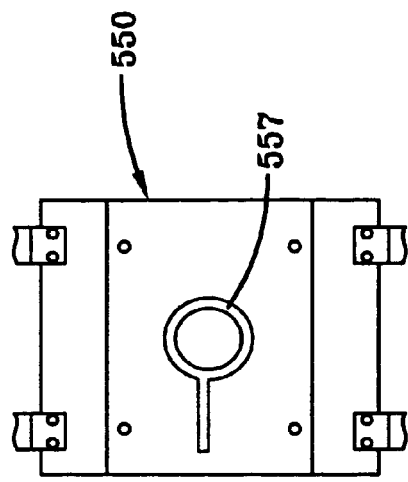
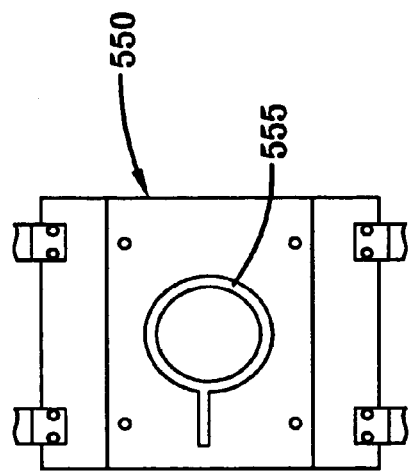
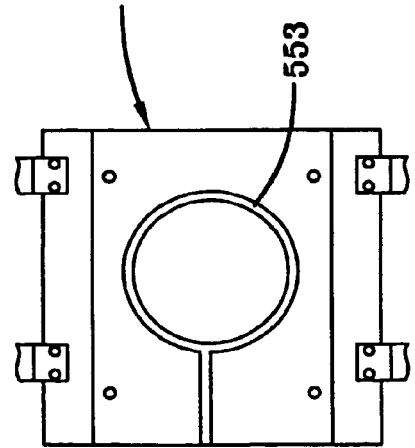

APPARATUS AND METHOD FOR SEALING A VERTICAL PROTRUSION ON A ROOF

This application is a divisional of U.S. patent application Ser. No. 11/129,914, filed May 16, 2005, now U.S. Pat. No. 7,387,149 which is a continuation of U.S. patent application Ser. No. 10/374,688, filed Feb. 26, 2003, now U.S. Pat. No. 6,892,782, which is in turn a continuation of U.S. patent application Ser. No. 10/124,931, filed Apr. 18, 2002, now U.S. Pat. No. 6,892,499, which claims the benefit of priority of U.S. Provisional Application No. 60/353,251, filed Feb. 1, 2002. This application is also a continuation of U.S. patent application Ser. No. 10/125,674, filed Apr. 18, 2002, now abandoned. Each of the above applications is incorporated by reference in its entirety.

BACKGROUND AND SUMMARY OF THE INVENTION

The present invention relates generally to roof-covering devices, and more particularly to a boot for covering and providing a water-tight seal around a protrusion on a roof.

Polymer coated membranes are commonly used to cover roofs. Often, the membrane is custom designed for the particular roof on which it is used. The roof measurements are provided to the factory which creates a unitary membrane from separate pieces which have been heat welded together.

Although these roofs are generally flat, there are frequently items protruding from the surface of the roof, such as vents, ductwork, air conditioning units, and the like. The size of these items should be provided to the factory so that accommodations can be made for them in the membrane. Locations of these items at certain points on the roof may also be provided to the factory.

The present invention specifically relates to a boot for covering and sealing a vertical protrusion (e.g., pipe) extending from a roof to be sealed. When installing a roof membrane, it is desirable to provide a water-tight seal around protrusions in a roof. Typically, when installing a boot around a protruding pipe, generally three seals are made to provide a water-tight seal around the pipe. The first of these is a seal between a base portion of the boot and a top portion of the boot. This first seal may be a hot air seal, a weld, a seal made with an adhesive or glue or a seal made with caulk. The second seal is a seal of the base portion to the roof or a to a roof membrane that may be formed of the same or similar material as the base portion, or another material. The second seal may be a heat bond or another leak-proof seal, such as a hot air seal, a weld, an adhesion or a caulking. The third seal is made between a top end of the top portion of the boot and a perimeter of the vertical protrusion, to prevent water from entering any space between the boot and the protrusion.

Currently this process of sealing a protruding pipe takes a relatively long time and can result in a poor seal. Accordingly, the present invention relates to a new method and apparatus for sealing vertical protrusions on a roof allowing the boot of the present invention to be relatively easily installed and adjusted to provide a tight seal for protruding pipes.

The boot of the present invention may be preferably comprised of: a top portion adapted to surround a predetermined portion of the protrusion (e.g., pipe) to be covered, the top portion having a top end and a bottom end, wherein the top end has a top opening and wherein the bottom end has a bottom opening; a base portion, wherein the base portion may be connected to a bottom edge of the top portion and wherein the top portion may extend substantially in the vertical direction when the base portion resides on the roof. It is also preferred that the bottom opening of the boot be adapted to accept a protrusion (e.g., pipe) to be covered. In an exemplary embodiment, the top end of the top portion may have a slit, the slit running vertically down a predetermined distance of the top portion of the boot and wherein the slit allows the top opening of the top portion to be adjusted in size to fit around various sizes of pipe to be sealed.

In another exemplary embodiment of the present invention, the top portion may be used without a base in certain situations.

The boot of the present invention may preferably be formed by: providing a first piece of material having a first side edge and a second side edge; forming a top portion having a bottom opening and top opening and a slit portion at a top end of the top portion, said top portion formed by sealing a bottom portion of the first side edge to a corresponding bottom portion of the second side edge; heating and then compressing the bottom edge of the top portion so that the bottom edge turns horizontally outward forming a flat horizontal circumference around the entire bottom of the top portion; providing a base portion; and sealing a bottom edge of the top portion with the base portion so that the top portion may be substantially vertical with respect to the base portion when the base is in the flat horizontal position.

In one embodiment, the bottom edge of the top portion may be folded and positioned around the edge or perimeter of the opening in the base portion. The bottom edge of the top portion may then be welded to the base portion to form a weld that may be substantially flat on the same plane as the base portion. This weld allows the base portion to lay substantially flat during the welding process obviating the need to deform the edge of the base opening to accomplish the weld. In this embodiment, the bottom edge of the top portion may overlap the perimeter of the opening of the base portion or the perimeter of the opening of the base portion may overlap the bottom edge of the top portion when welded.

In an alternative embodiment, the edge of the base portion may be folded up to make a lapped engagement with the vertical portion of the top portion. Accordingly, a weld may be made along the substantially flat base portion as well as the vertical top portion to provide a strong seal (i.e., welded).

In yet another embodiment, the top portion may be used without a base. Particularly, when the bottom edge of the top portion is turned out with a sufficient width that a seal may be formed with the roof or roofing membrane, then a base may not be needed. In this embodiment, the bottom edge may be of such a sufficient width that it may serve as a base. Top portions may be sized at the factory to fit particular sizes of pipes on roofs, or the top portions may comprise a slit near their top for adjustments to fit different sizes of pipes.

The boot may then be installed by placing the bottom opening of the top portion over a protrusion to be covered; placing the base portion (if it has a base portion) flat over the roof, pulling a top portion of a side edge of the vertical portion around the protrusion (e.g., pipe) so that the top opening of the top portion may be adjusted to fit the protrusion, sealing the top opening of the top portion around the protrusion, and sealing the base portion to the roof or roofing membrane. If an embodiment is used without a base, the bottom edge of the top portion that has been turned out to a sufficient width may be sealed directly to the roof or roofing membrane.

In another open boot flashing embodiment, the flashing may be open to allow the flashing or "stack" to be wrapped around the protrusion to be covered. After wrapping the protrusion, the top and base portions are welded to complete the seal. The open flashing may comprise a base portion having an opening, a top portion attached to the base portion along the opening in the base portion, a break in the base portion and the top portion, the break in the base portion separating a first portion of the base portion from a second portion of the base portion, and wherein the break in the top portion separates a first portion of the top portion from a second portion of the top portion; and wherein the break allows the apparatus to be opened to accept a protrusion on the roof to be covered and wherein the first portions of the base portion and the top portion may be pulled around the protrusion and sealed to the second portions of the base portion and top portion, respectively. The first portions of the base portion and top portion may be adjustably pulled around the protrusion to accommodate protrusions of various sizes.

In one embodiment, the bottom edge of the top portion may be folded and positioned around the edge or perimeter of the opening in the base portion. The bottom edge of the top portion may then be welded to the base portion to form a weld that may be substantially flat on the same plane as the base portion. This weld allows the base portion to lay substantially flat during the welding process obviating the need to deform the edge of the base opening to accomplish the weld. In this embodiment, the bottom edge of the top portion may overlap the perimeter of the opening of the base portion or the perimeter of the opening of the base portion may overlap the bottom edge of the top portion when welded.

In an alternative embodiment, the interior edge of the base portion may be folded vertically straight up to make a lapped engagement with the vertical wall of the top portion. Accordingly, a weld may be made along the overlapped portions to provide a strong weld.

A flat edge with sufficient width formed at the bottom of the top portion may be formed by placing the top portion into a die, with a portion of the material sticking out. A seal forming cone and handle may be inserted into the top portion. This material sticking out above the die may then be heated for a sufficient time to disrupt the molecules in the material, thereby allowing the material to expand. The handle may then be placed in its locking position, extending the members that may resemble pie sections of the seal forming cone and pushing the material outward so that a horizontally flat circumference (i.e. bottom edge with sufficient width) may be formed.

In addition to the novel features and advantages mentioned above, other objects and advantages of the present invention will become readily apparent to those skilled in the art from reading the following detailed description of the drawings and exemplary embodiments.

BRIEF DESCRIPTION OF THE DRAWINGS

A better understanding of the invention will be obtained by review of the appended drawings and the accompanying text, wherein identical parts are identified by identical part numbers and wherein:

FIG. 12 is a side view and bottom view of the handle of the device of FIG. 7;

FIGS. 13a and 13b illustrate a top view and a side view of the cap of FIG. 7, respectively;

FIGS. 14a and 14b illustrate a top view and a side view of the lock plate of FIG. 7, respectively;

FIGS. 15a and 15b illustrate a top view and a side view of the lock plate mount of FIG. 7, respectively;

FIGS. 16a through 16c illustrate respective top, side and perspective views of the seal forming cone of FIG. 7;

FIGS. 19a through 19e are top and side views of the components of the heat gun mount of FIG. 7;

FIGS. 26a through 26d are top views of a heat platen assembly of a device for assembling the roof fitment of the present invention with FIGS. 26b through 26d showing different sized heating elements;

DETAILED DESCRIPTION OF A PREFERRED EMBODIMENT

The exemplary systems herein described are not intended to be exhaustive or to limit the invention to the precise forms disclosed. They are chosen and described to explain the principles of the invention, and the application of the method to practical uses, so that others skilled in the art may practice the invention.

Commonly-owned U.S. Pat. No. 6,691,473 is incorporated by reference as if fully recited herein.

Figure 1:
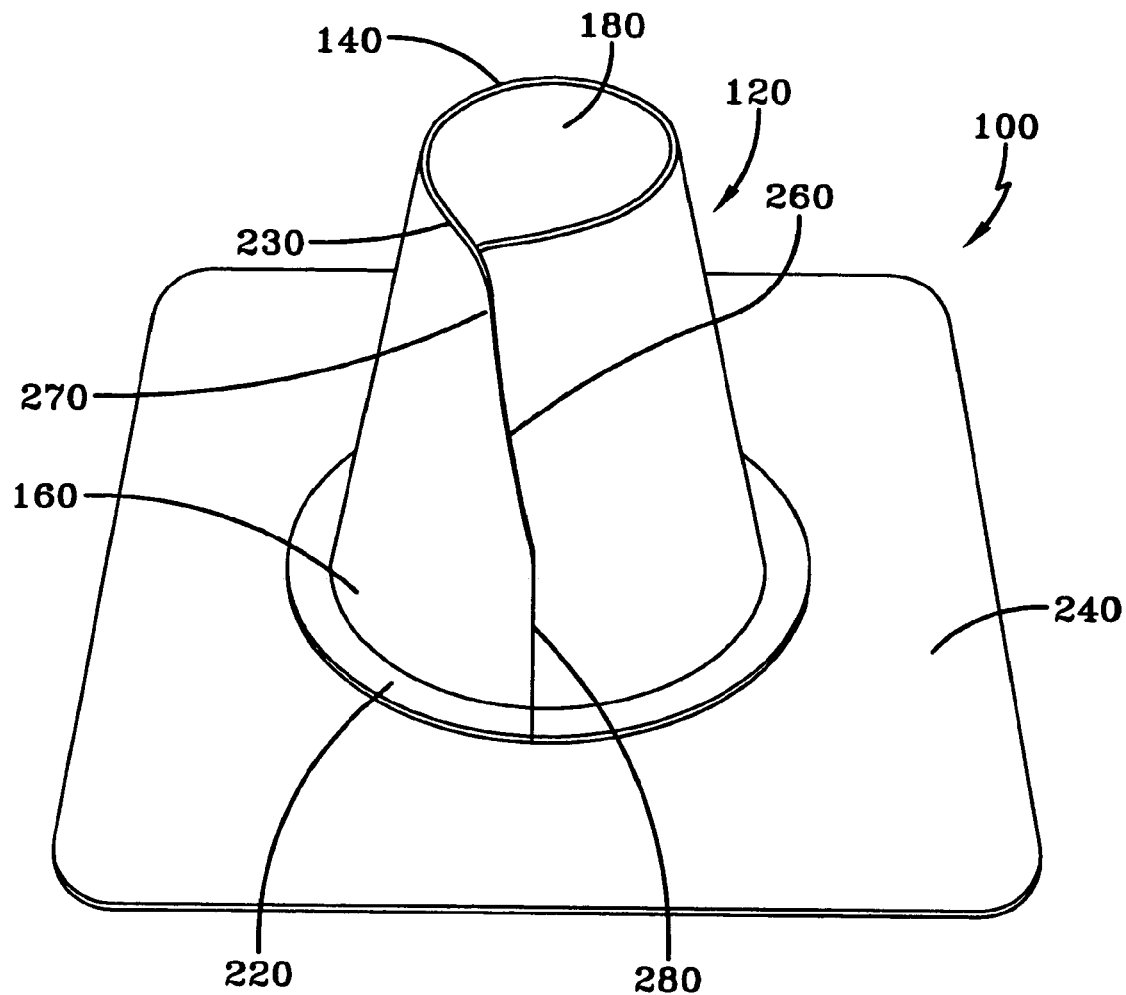
FIG. 1 is a perspective view of one embodiment of the boot of the present invention.

FIG. 1 illustrates a first embodiment of the present invention boot 100. The boot 100 may be adapted to seal protrusions, such as pipes, on a roof. In the embodiment shown, the boot 100 has a top portion 120 adapted to surround a predetermined portion of a protrusion (e.g., pipe) to be covered. The top portion 120 has a top end 140 and a bottom end 160, wherein the top end 140 has a top opening 180 and wherein the bottom end 160 has a bottom opening 200 (see FIG. 3a). The first embodiment boot 100 also has a base portion 240, which may be connected to a bottom edge 220 of the top portion 120. The top portion 120 extends substantially in the vertical direction when the base portion 240 resides on the roof.

In one embodiment, the bottom edge 220 of the top portion 120 may also be folded and positioned around the edge or perimeter of an opening 400 (see FIG. 4) in the base portion 240. The bottom edge 220 of the top portion 120 may then be welded to the base portion 240 around the opening 400 to form a weld that may be substantially flat on the same plane as the base portion 240. This weld allows the base portion 240 to lay substantially flat during the welding process obviating the need to deform the edge 405 (see FIG. 4) of the base opening 400 to accomplish the weld.

In an alternative embodiment, the edge 405 of the base opening 400 may be folded up to make a lapped engagement with the vertical wall of the top portion. Accordingly, a weld may be made along the overlapped material to provide a strong leak-proof seal.

In an exemplary embodiment, the top end 140 of the top portion 120 may have a slit 260 (not welded at the factory), the slit 260 running vertically down a predetermined distance of the top portion 120 of the boot 100 and wherein the slit 260 allows the top opening 180 of the top portion 120 to be adjusted in size to fit around the protrusion (e.g., pipe) to be covered. It is preferred that the slit 260 extend about 2 inches from a top edge 230 of the top portion 120 to allow flexibility for the top opening 180 to be adjusted in size. The top opening 180 may be made smaller by pulling the "flap" portion 270 of the top portion 120 around the pipe. ("Flap" in this instance merely refers to an overlapping section 270 of the top portion 120 that is not sealed at the factory.)

Figure 2:
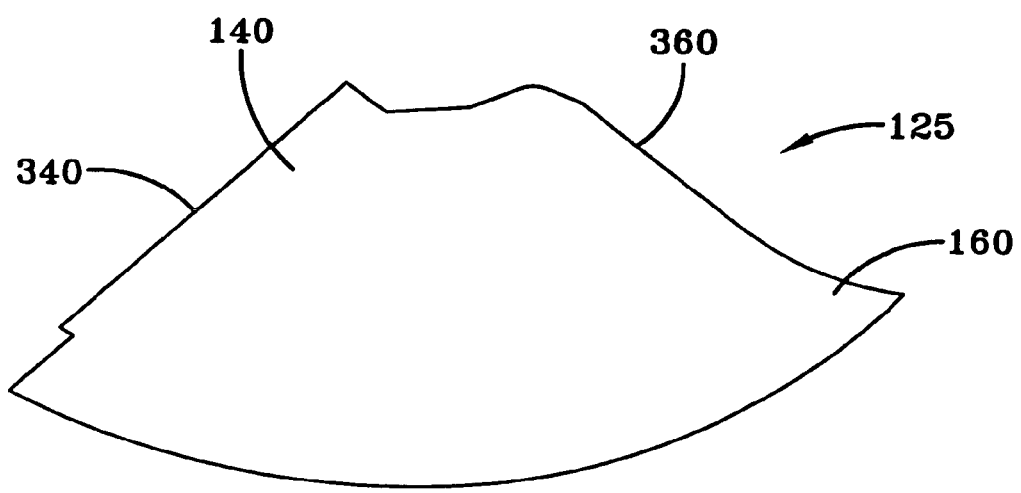
FIG. 2 is a perspective view of one embodiment of an unassembled top portion of the boot of FIG. 1.

FIG. 2 illustrates one embodiment of a material blank 125 used to form the top portion 120 of the boot 100 of FIG. 1. The material blank 125 may have a first side edge 340 and a second side edge 360. A conical shaped top portion 120 may be formed from the unassembled top portion 320 when the first side edge 340 and the second side edge 360 are sealed together (see FIG. 3a). In an exemplary embodiment, the first side edge 340 may be heat welded to the second side edge 360 forming a heat welded section 280 on the assembled top portion 120. The first and second side edges 340, 360 of the top portion 120 may be heat welded along a predetermined portion of the bottom end 160 of the top portion 120, whereafter the unattached sections of the first and second side edges 340, 360 form the slit 260. The bottom circumference of the top portion 120 may then be heated, thereby softening the material, thereby allowing the formation of a bottom edge 220 that may extend substantially perpendicularly from the axis of the conical shaped top portion 120.

Figure 3A:
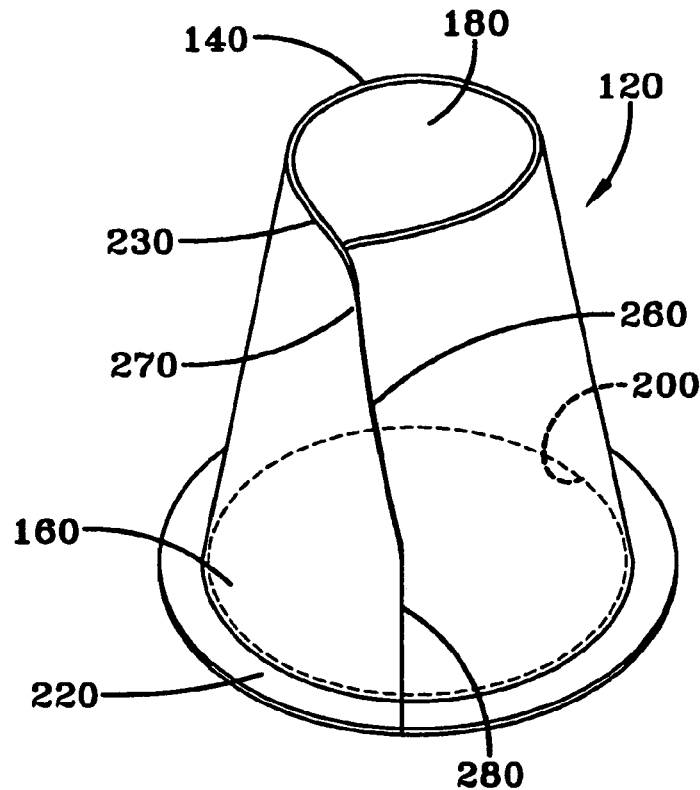
FIGS. 3a and 3b are perspective views of embodiments of an assembled top portion of the boot of FIG. 1, the FIG. 3b embodiment having a bottom edge of a greater width, which may also be used without a base portion.
Figure 3B:
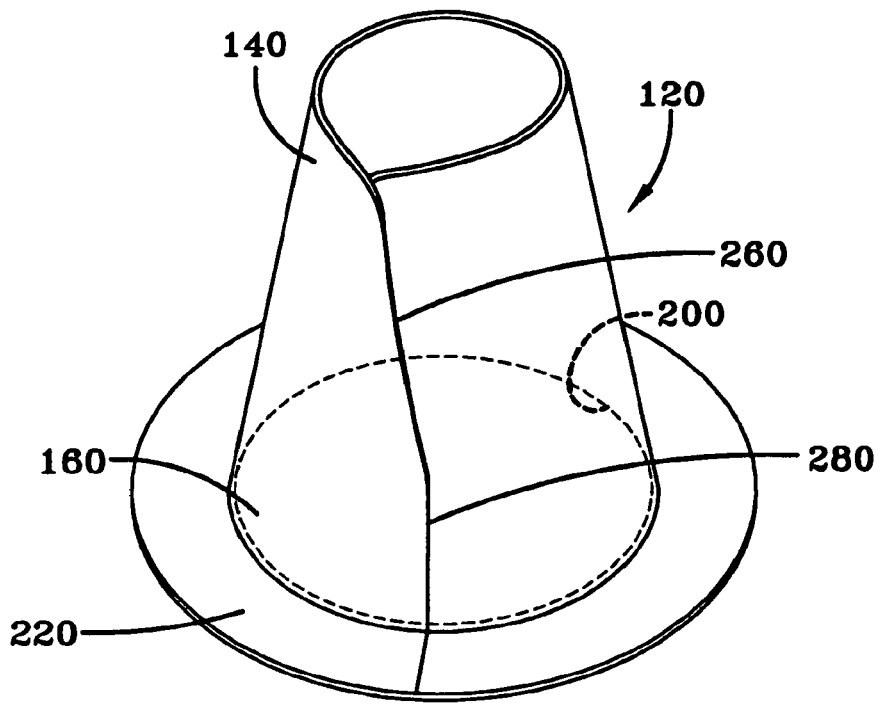

FIGS. 3a and 3b illustrate embodiments of an assembled top portion 120 that can be used with boot 100. As the top portion 120 may be cone shaped, the top opening 180 is smaller than the bottom opening 200. However, in another embodiment, the top portion 120 may be substantially cylindrical in shape, whereby the top opening 180 and the bottom opening 200 may be substantially similar in size.

Figure 4:
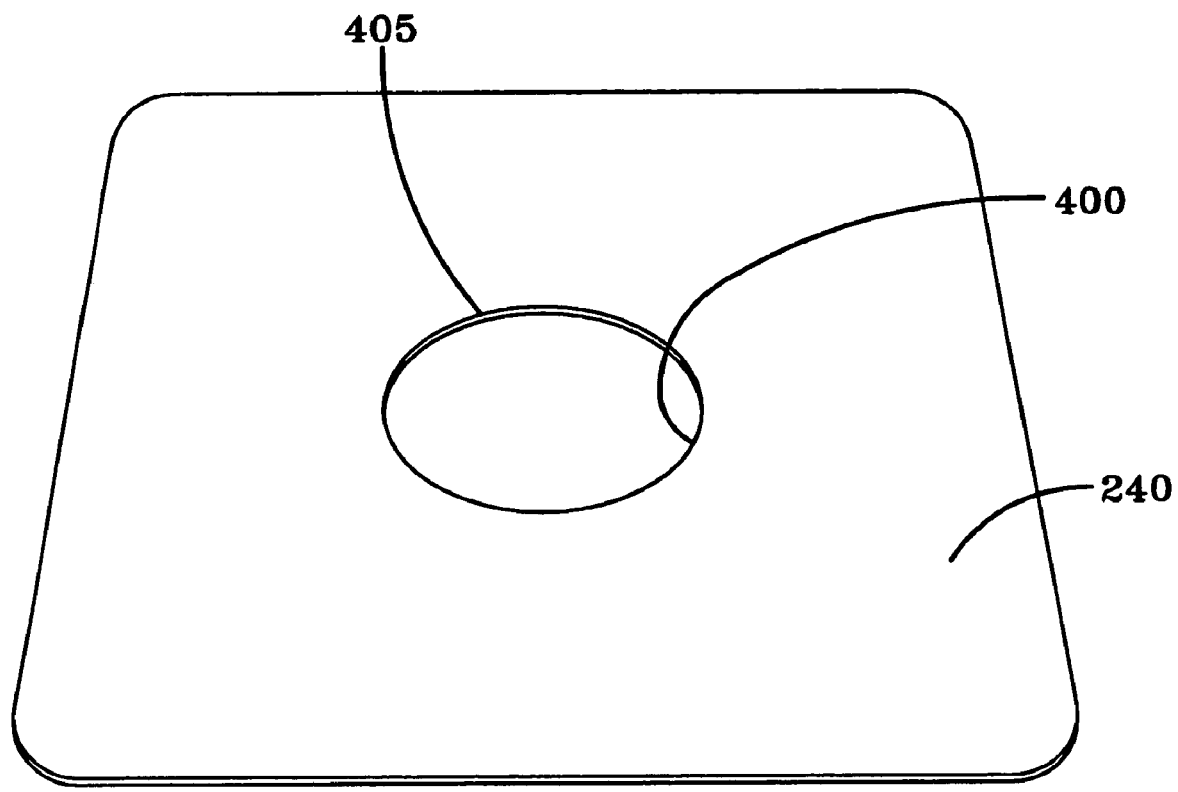
FIG. 4 is a perspective view of a base portion of the boot of FIG. 1.
Figure 5A:
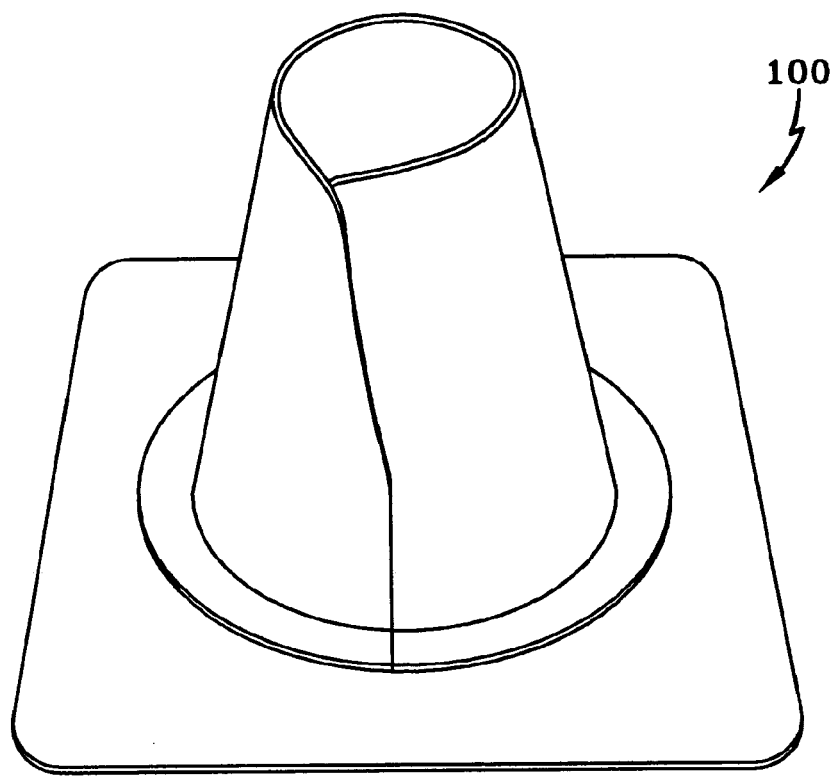
FIGS. 5a and 5b are perspective views of additional embodiments of the boot of the present invention, where the bottom edge of the top portion overlays the base.
Figure 5B:
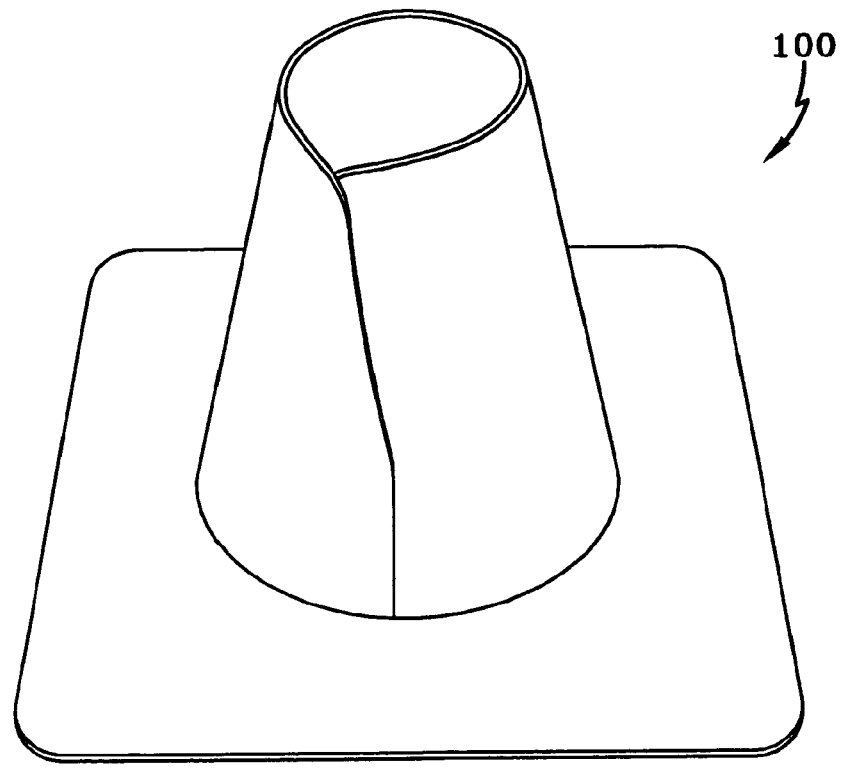

FIG. 4 illustrates one embodiment of a base portion 240 of the boot 100 of FIG. 1. In one embodiment, the base portion 240 may be heat welded to the bottom edge 220 of the top portion 120. The base portion 240 and top portion 120 may be formed together using dies (e.g. female and male counterpart dies where the male part may be a cylindrical shaped piece for forming the top portion 120 around the base portion 240). In this embodiment, the bottom edge 220 of the top portion 120 may overlap the perimeter of the opening 400 of the base portion 240 or the perimeter of the opening 400 of the base portion 240 may overlap the bottom edge 220 of the top portion 120 when welded, as shown in FIGS. 5a and 5b, respectively.

Figure 6:
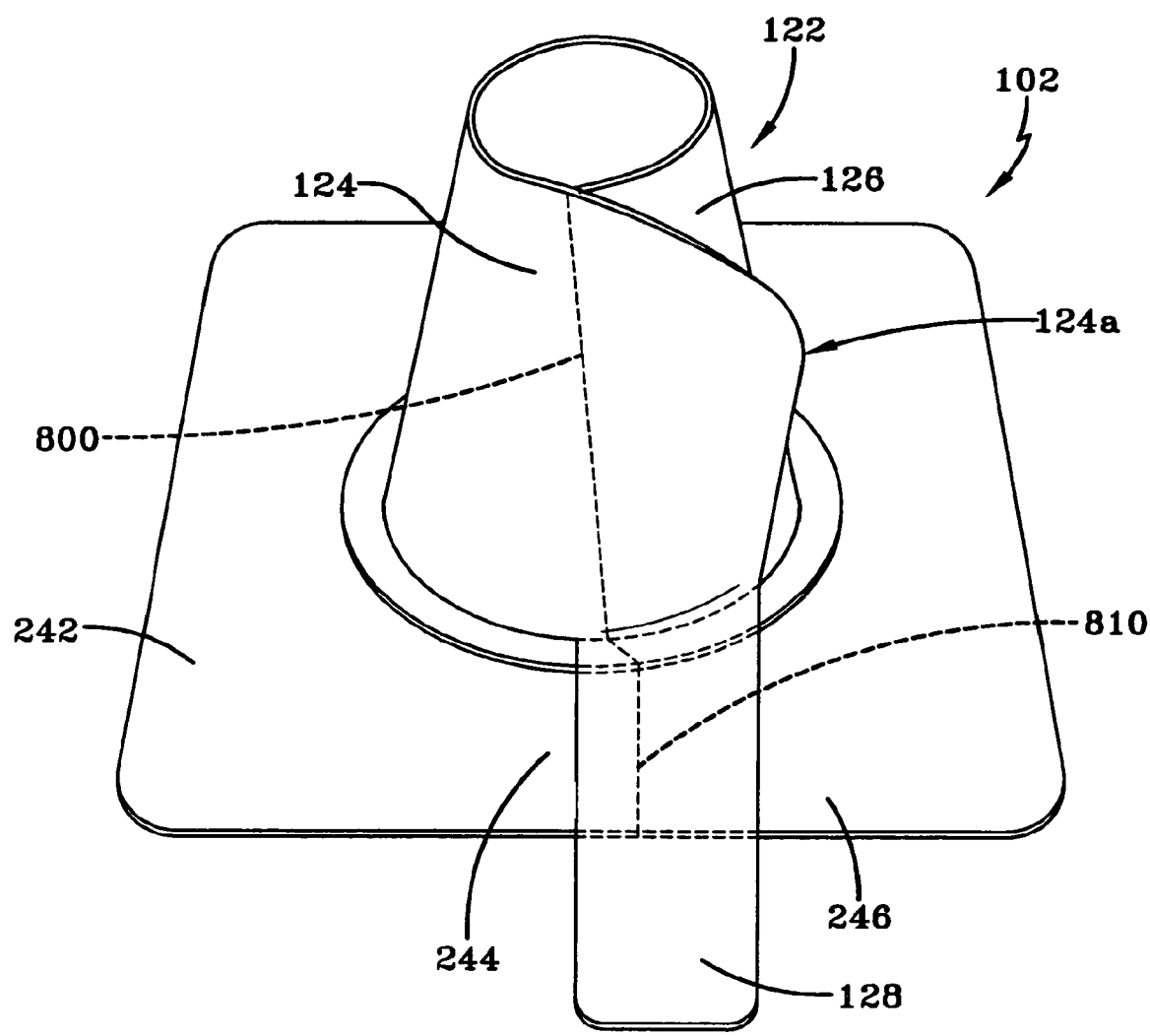
FIG. 6 is a perspective view of an open stack embodiment of the boot of the present invention.
Figure 8:
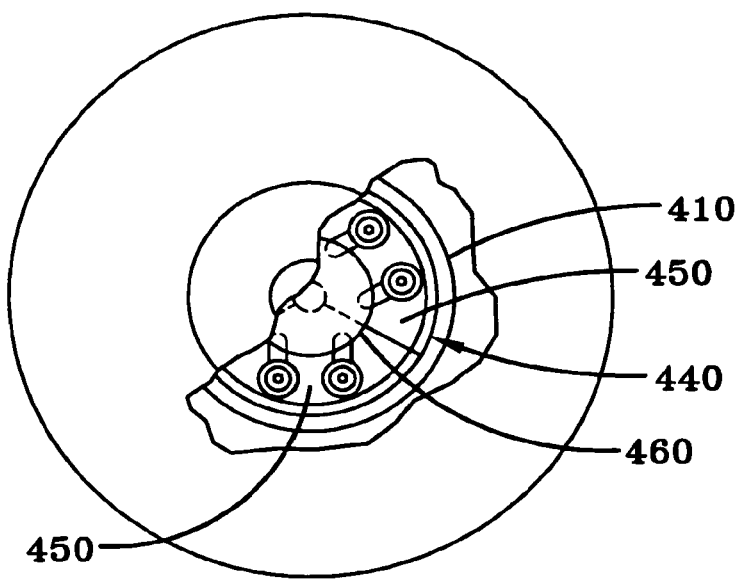
FIG. 8 is a top view of a die showing three different die sections of the device of FIG. 7.

A split version of a sealing boot 102 is illustrated in FIG. 6. The split sealing boot 102 can be opened in order to accept a roof-located vertical protrusion to be sealed. Prior to bonding, the split boot 102 has a top portion 122 that is divided by a slit therein (not shown) into a first section 124 and a second section 126. The first section 124 is designed to overlap the slit and a part of the second section 126 once the boot 102 is installed to the protrusion. The first section 124 may have an extended portion 124a to assist in pulling the first section across the second section 126 during assembly. The top portion is welded to a base portion 242, that is also divided by a slit therein (not shown) into a first portion 244 and a second portion 246. In this embodiment, a flap 128 extends substantially horizontally outward some distance from the bottom of the top portion 122, although the flap could also be attached to one or the other of the sections 244, 246 of the base portion 242. The flap 128 is preferably sized and located so that it covers the slit in the base portion 242 after assembly of the boot 102 around the vertical protrusion.

In use, the split boot 102 is opened at the slits in the top and base portions 122, 242, respectively, and placed around the vertical protrusion to be sealed. Preferably, the boot 102 is thereafter closed around the vertical protrusion by joining the first and second sections 244, 246 of the base portion 242, and the first and second sections 124, 126 of the top portion 122—in any order. The joined sections may be sealed together by hot air bonding. The flap 128 may then be placed over the slit in the base portion 242, and sealed thereto by hot air bonding.

The boot 100 of the present invention may preferably be made by first providing a material blank 125 for forming the top portion 120, the material blank 125 having a first side edge 340 and a second side edge 360. The top portion 120 may be assembled by sealing a bottom portion of the first side edge 340 to a corresponding bottom portion of the second side edge 360. This seal is shown at 280. The top portion 120 may have a slit 260 at a top end 140 of the top portion 120 and a bottom and top opening 180, 200. In an exemplary embodiment of the boot 100, the top portion 120 may be conical in shape. In another exemplary embodiment of the boot 100, the top portion 120 may be cylindrical in shape.

Figure 7:
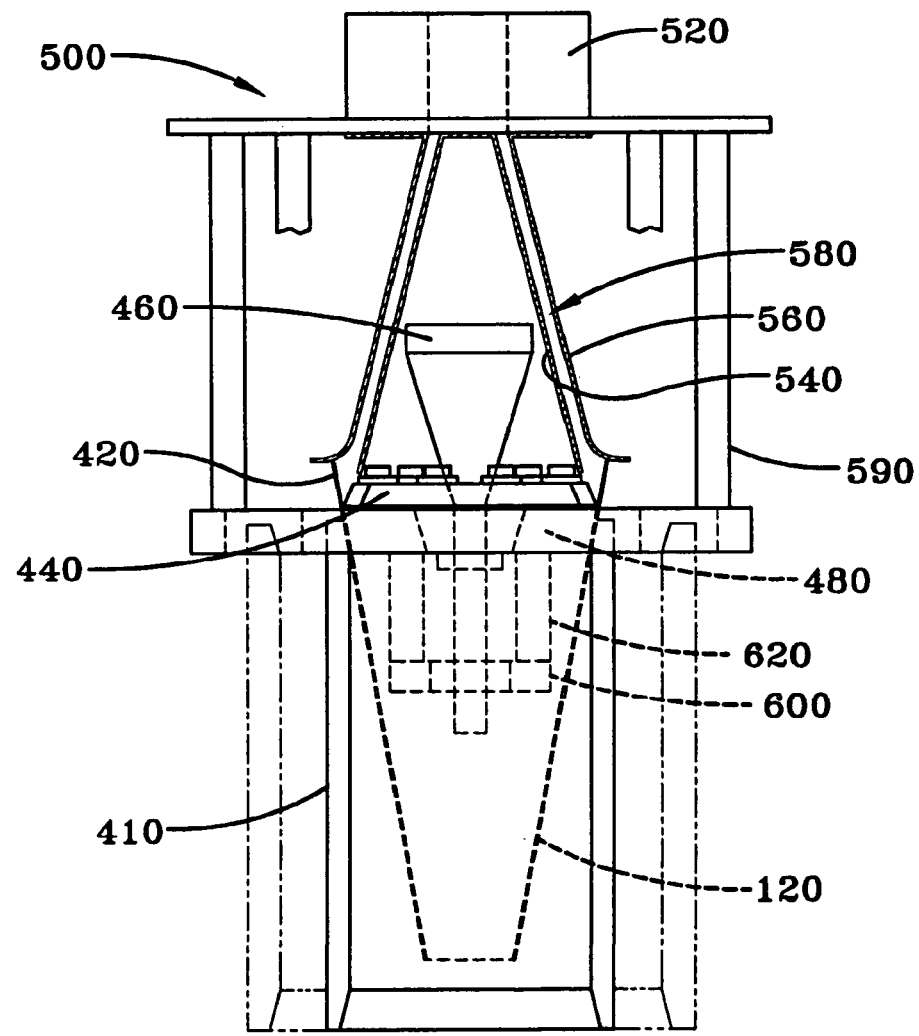
FIG. 7 is a side view of an exemplary embodiment of the device used in the method of making the bottom edge of the boot of the present invention.
Figure 11A:
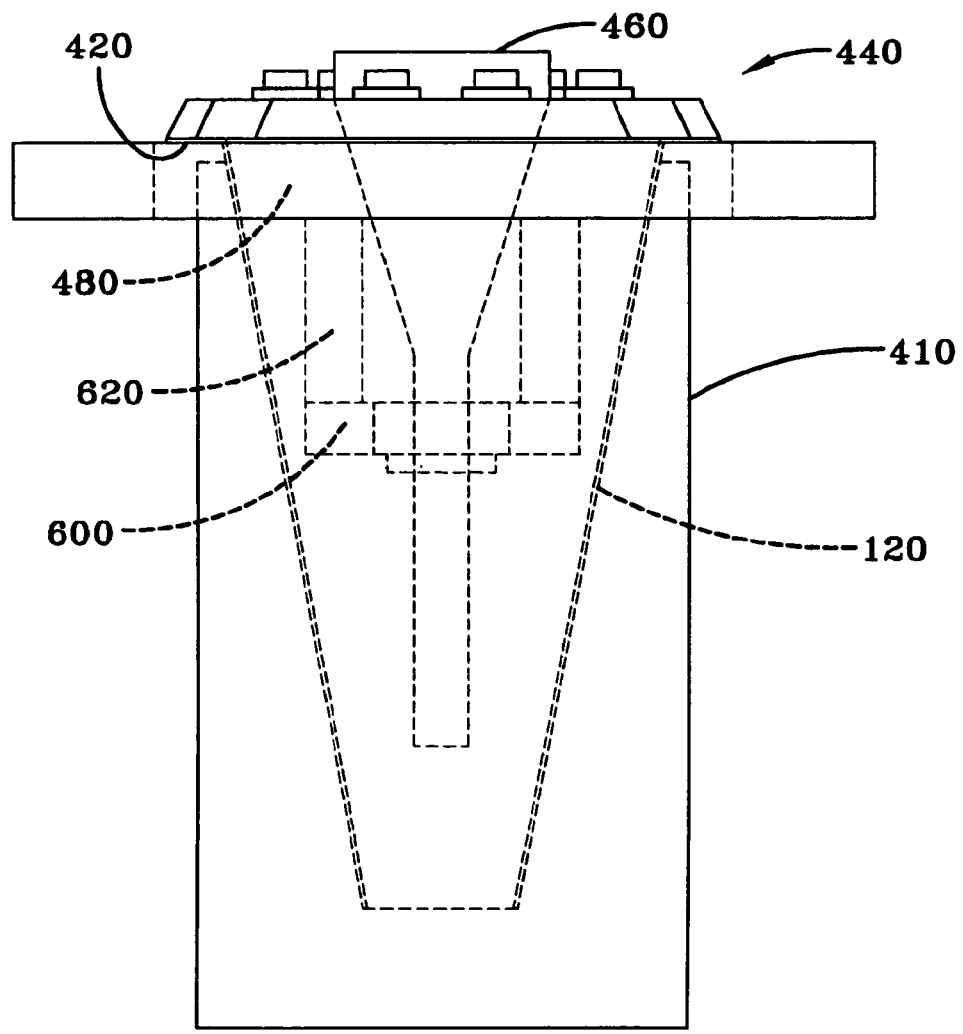
FIGS. 11a through 11e are views of the die of the device of FIG. 7.
Figure 11B:
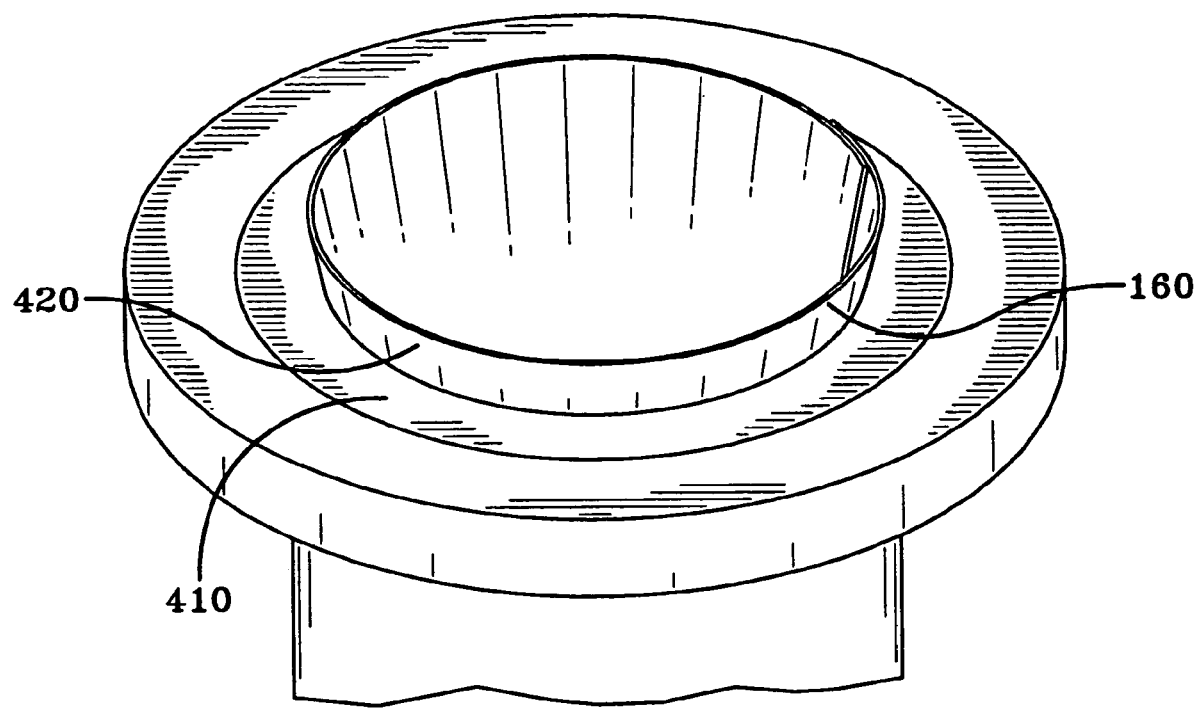

The top portion 120 may then be inserted into a die 410 with a portion of the material 420 at the bottom end 160 of the top portion 120 protruding therefrom, as shown in FIGS. 7 and 11b. In an exemplary embodiment, five-eighths of an inch of the material 420 may protrude from the die 410. In another exemplary embodiment, an inch and a half or greater of the material 420 may protrude from the die 410. However, various widths of the material 420 may be made to protrude from the die 410, as required to produce various embodiments of the boot of the present invention.

Figure 11C:
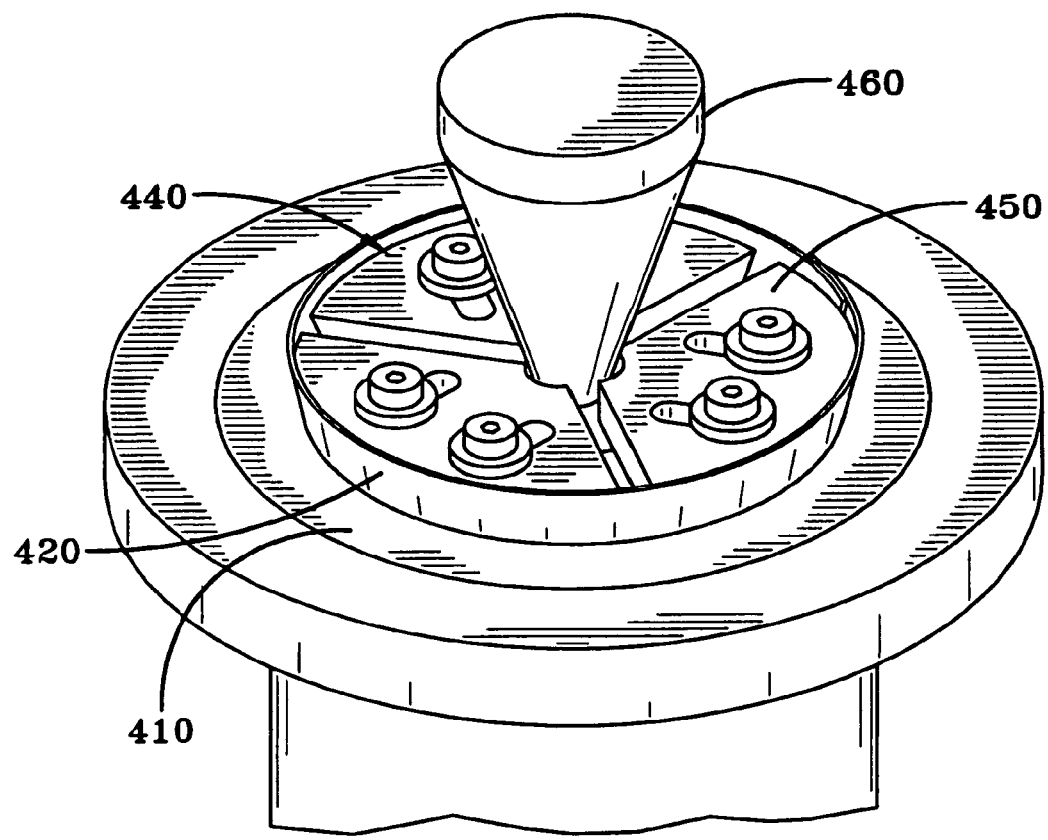

Next, the seal forming cone 440 and handle 460 may be inserted into the inverted cone, i.e., top portion 120, as shown in FIG. 11c. The seal forming cone 440 and handle 460 initially compresses the protruding material 420 between the cap 480 (see FIG. 7) and the inner wall of the die 410. Next, the material 420 may be heated by any number of heating devices on either its outside or inside surface, or on a combination of both sides thereof.

In an exemplary embodiment, one type of heating device may be a heat gun and cone bracket assembly 500, which may be installed on top of the die 410 with the inserted seal forming cone 440 and handle 460 configuration, as shown in FIG. 7. Heat may then be funneled from a heat gun mount 520, through the channel 580 formed between the inner cone 540 and the outer cone 560, and to the entire circumference of the protruding material 420. The protruding material 420 may be heated for a sufficient amount of time to disrupt the molecules therein, and to allow the material 420 to expand in order to enable the horizontally flat circumference of the bottom edge 220 to be formed. The heating device, in this embodiment the heat gun and cone bracket assembly 500, may then be removed.

Figure 9A:
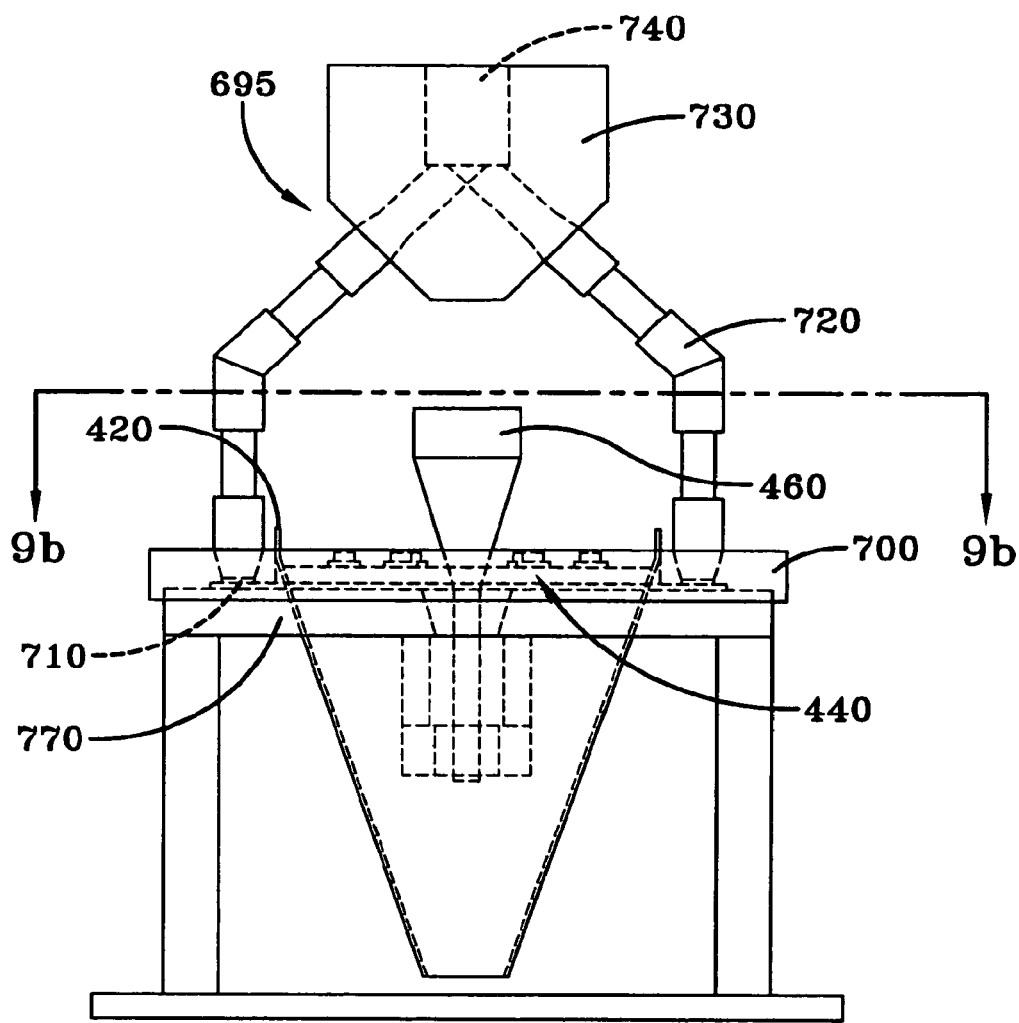
FIGS. 9a and 9b illustrate a side view and a top view, respectively, of another embodiment of a heating apparatus that may be used in forming a bottom edge on a top portion of a boot.
Figure 9B:
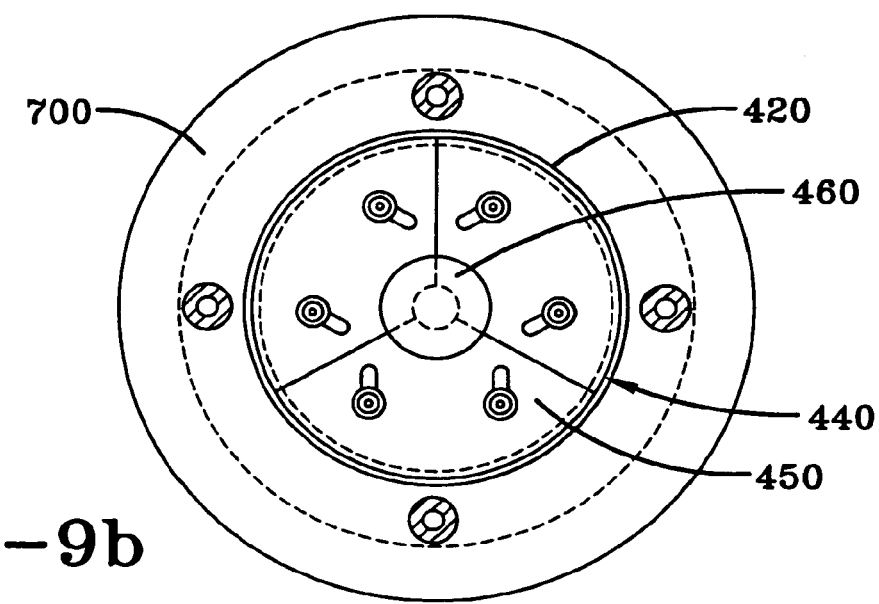
Figure 10:
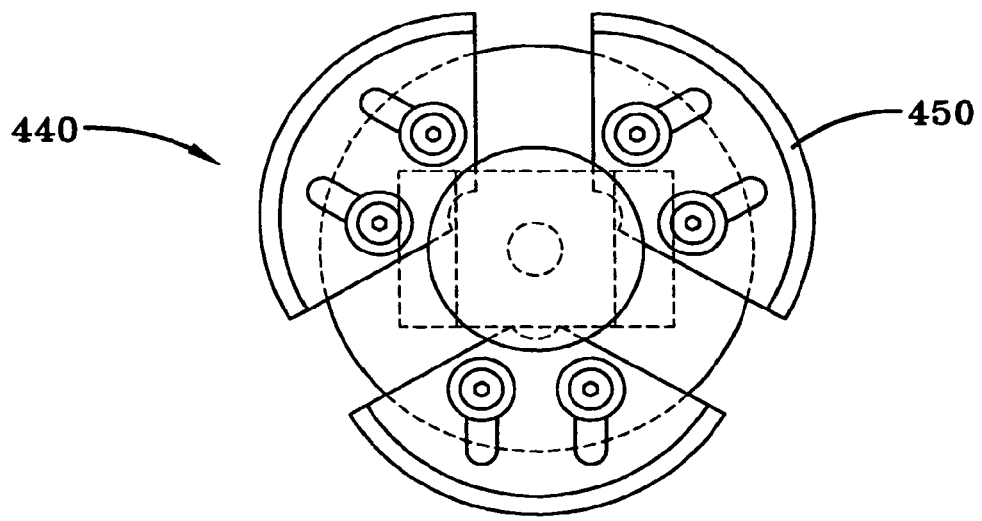
FIG. 10 is an expanded view of members (in the shape of pie sections) of a seal-forming cone of the FIG. 7 device.

In another embodiment, another type of heating device 695 that may be used is shown in FIGS. 9a and 9b. This heating device 695 may have a circular member 700, having a continuous channel 710. The circular member 700 may preferably be fitted around the protruding material 420 of the top portion 120. The circular member 700 may have a lower end of at least one, and preferably two or three, substantially hollow arms 720 attached thereto. The upper end of the arms 720 may then join together at a joining member 730, allowing the passageway within each arm to communicate with an opening 740 located therein. A hot air source (not shown), such as, but not limited to, a hot air gun, may be placed in or near the opening 740 of the joining member 730. Hot air is funneled from the hot air source, through the opening 740 of the joining member 730, and through the arms 720 to the continuous channel 710 of the circular member 700. The protruding material 420 of the top portion 120 may then be heated by the hot air for a sufficient time to soften the material 420, allowing it to be formed into the horizontally flat circumference of the bottom edge 220. Once the protruding material 420 is heated, the heating device 695 may be removed. FIG. 9a also shows that this type of heating device 695 may be used with the top portion 120 held inside a holding member 770 instead of a die 410.

Figure 11D:
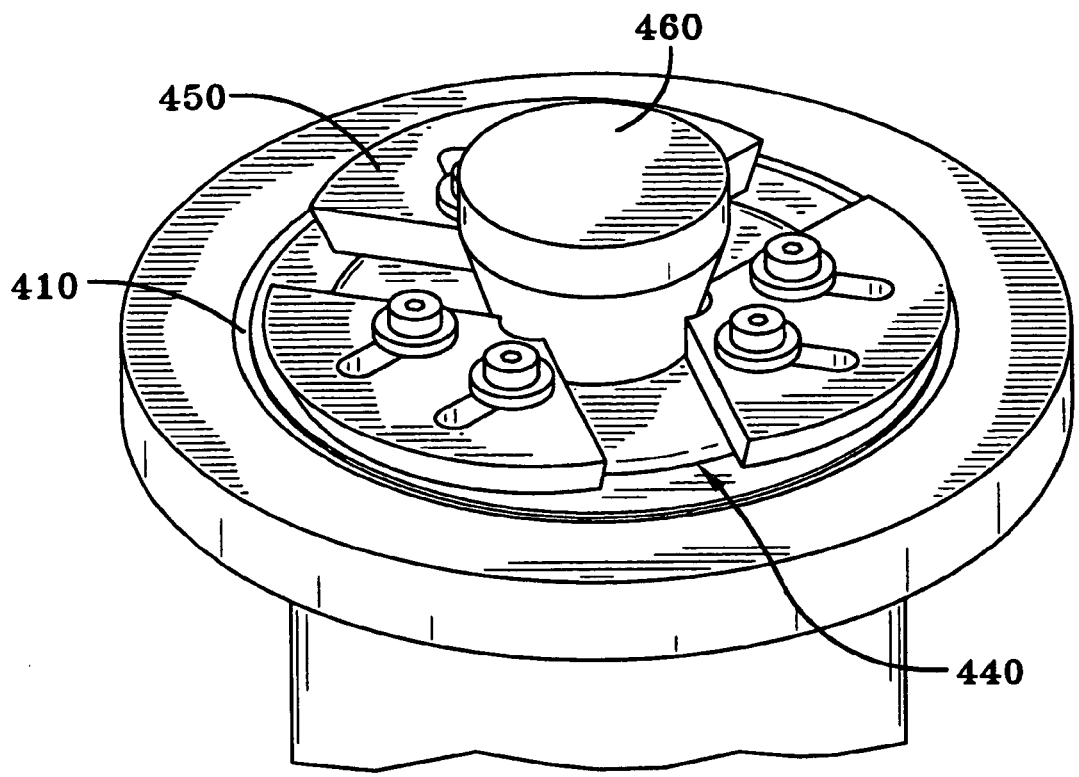
Figure 11E:
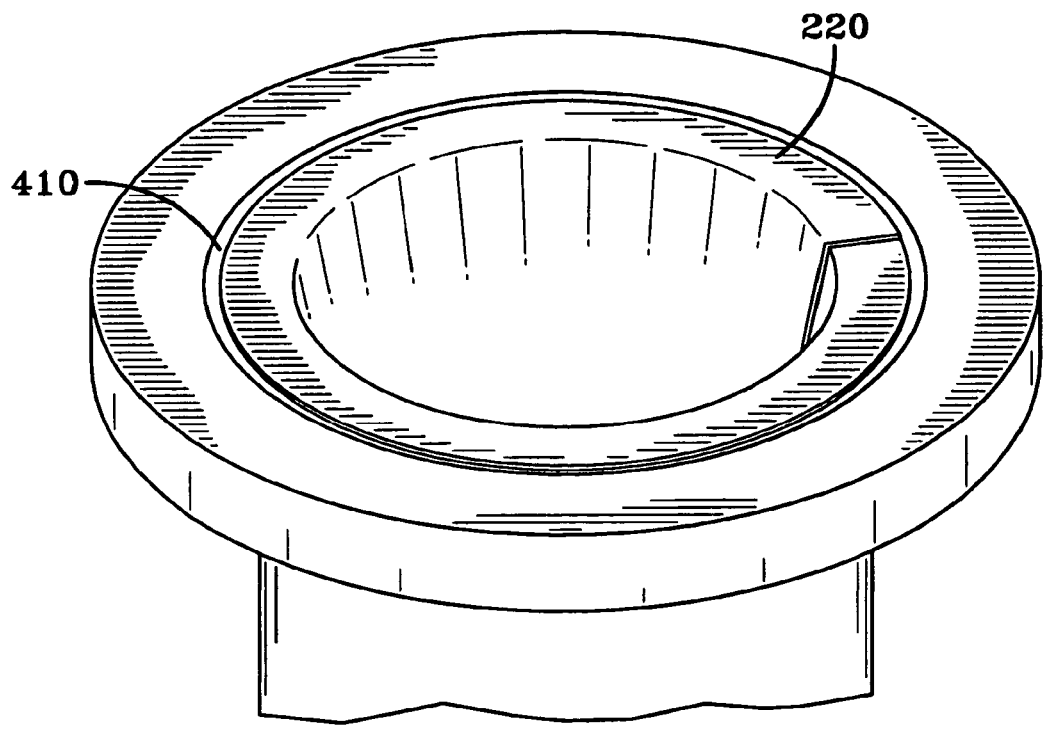
Figure 16C:
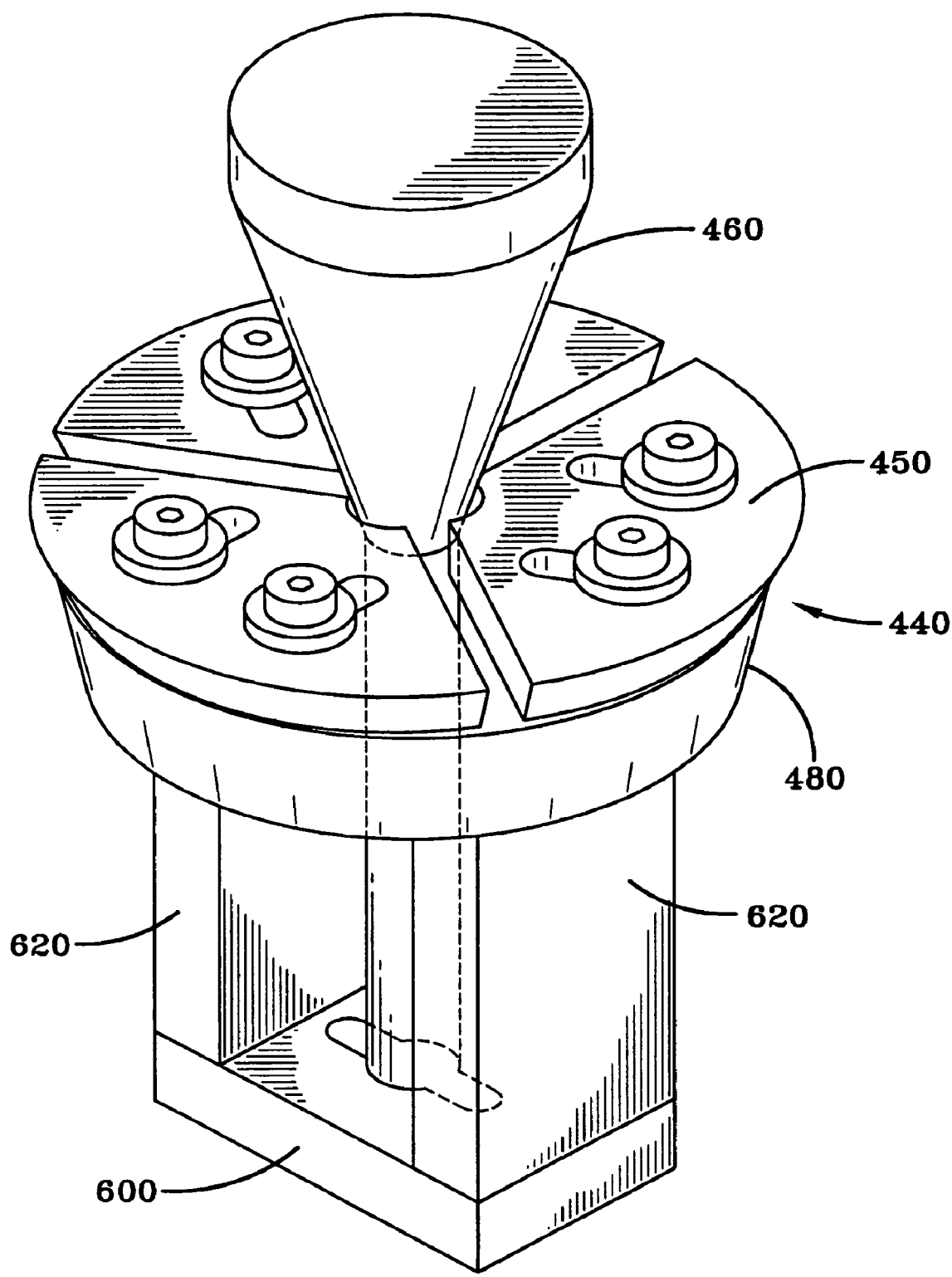
Figure 17A:
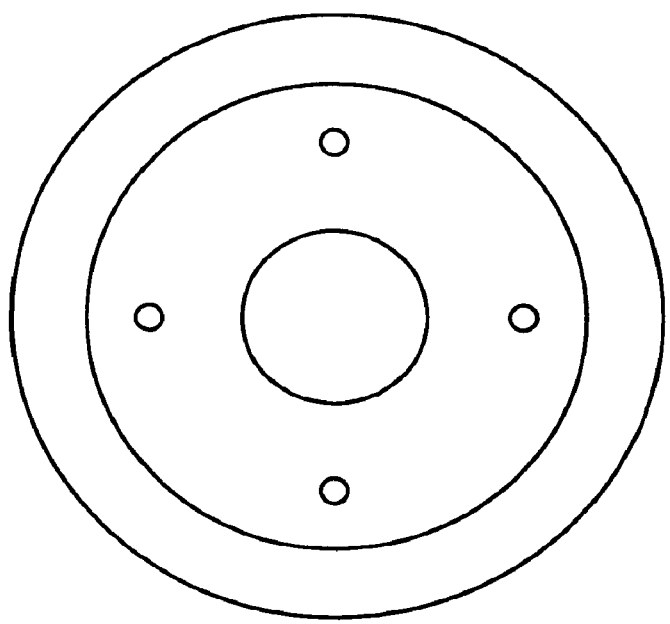
FIGS. 17a and 17b illustrate respective top and side views of the outer cone of FIG. 7.
Figure 17B:
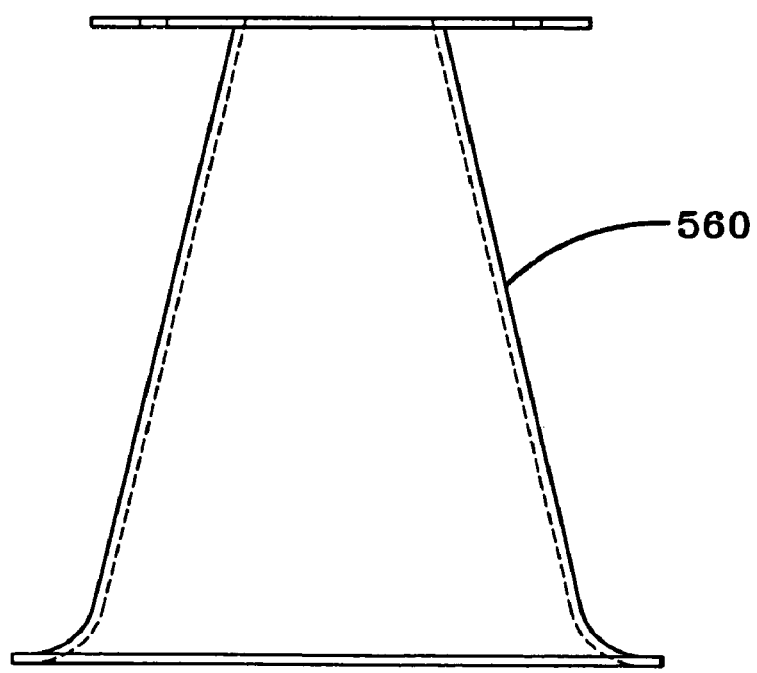
Figure 18A:
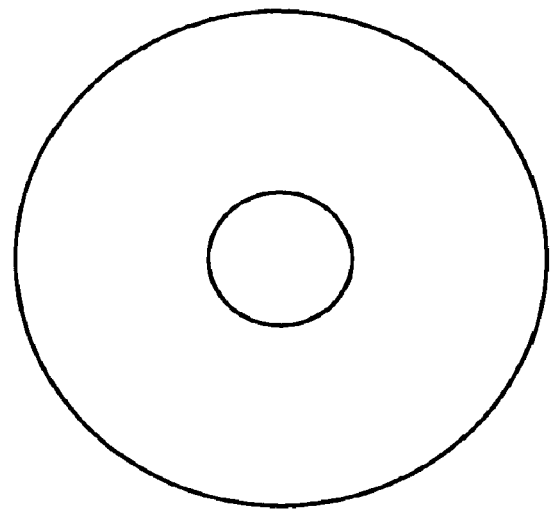
FIGS. 18a and 18b illustrate respective top and side views of the inner cone of FIG. 7.
Figure 18B:
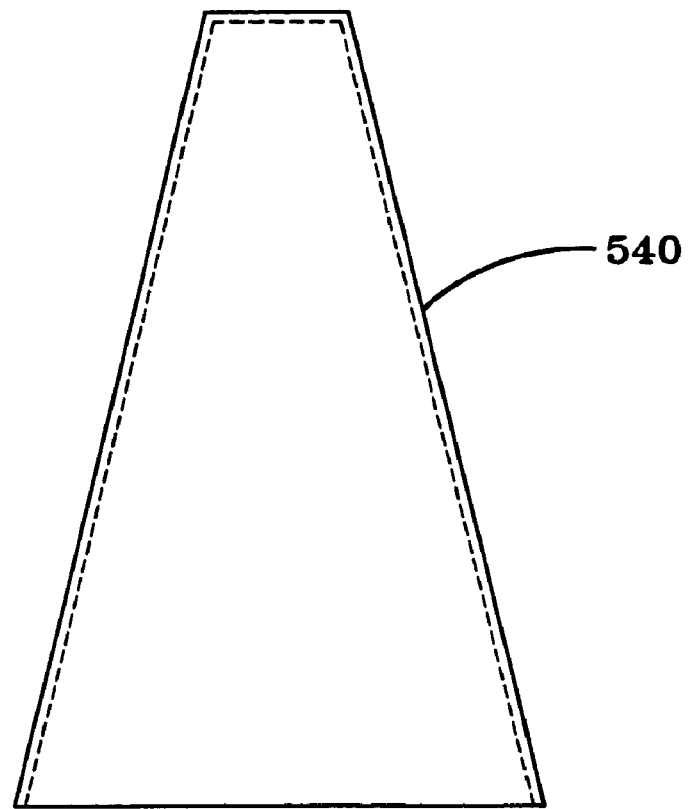
Figure 19A:
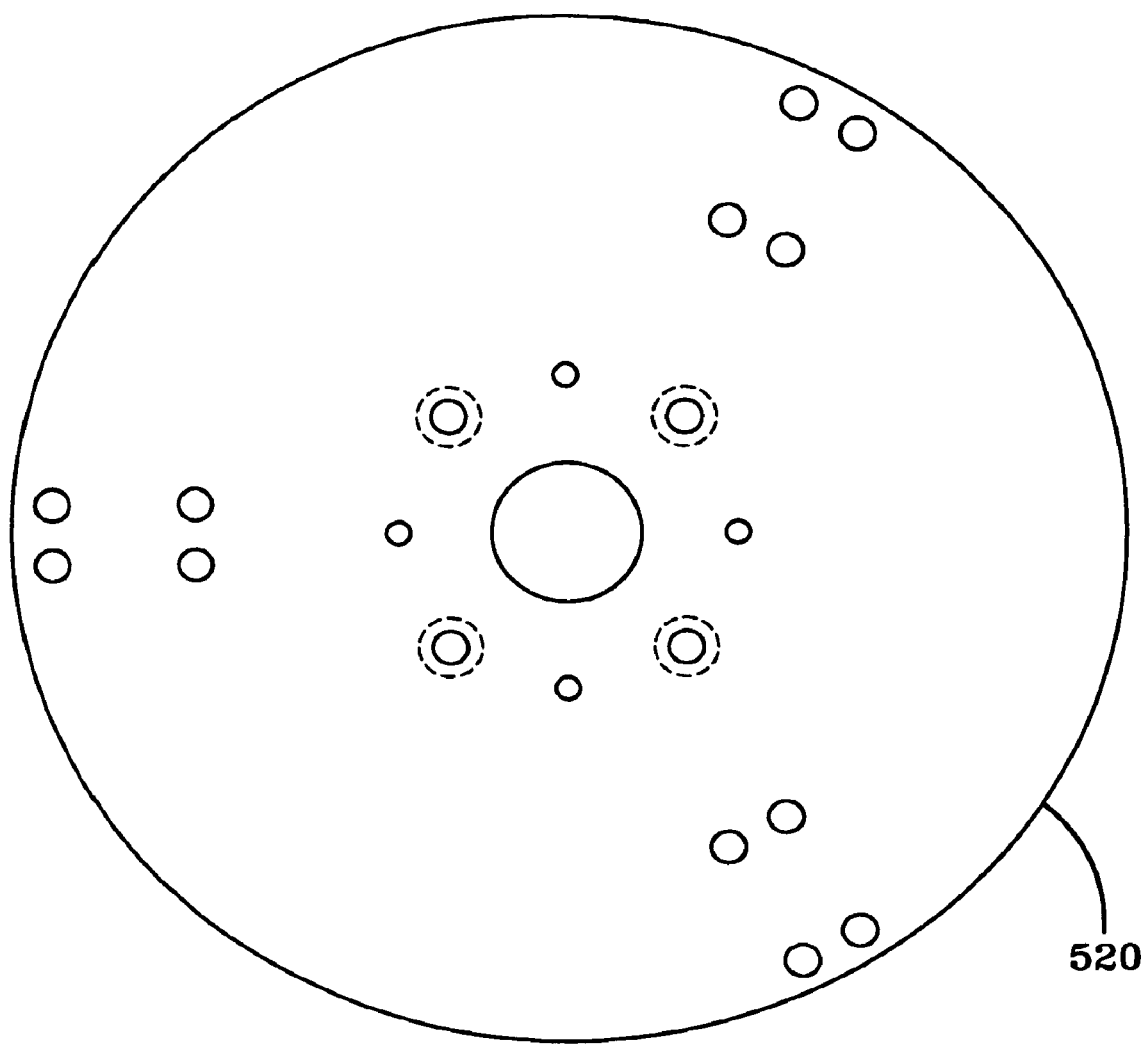
Figure 19B:
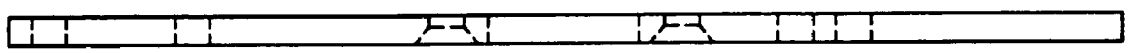
Figure 20:
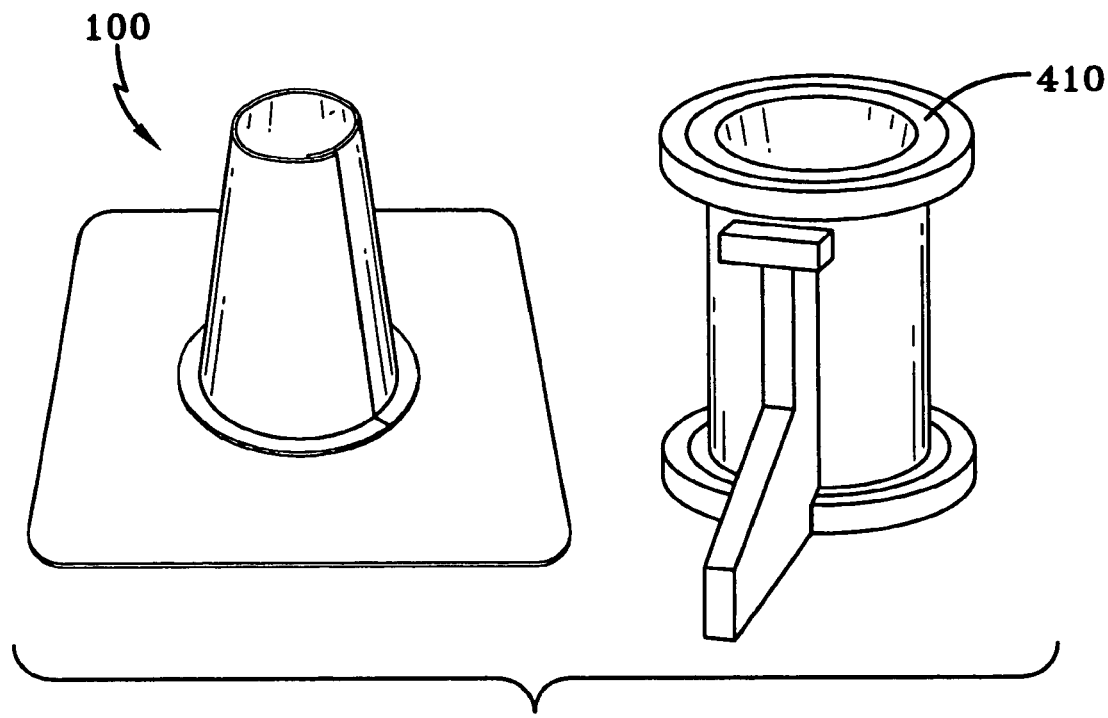
FIGS. 20 through 23 illustrate various size dies that are used to manufacture embodiments of the boot of the present invention, with corresponding boot embodiments depicted alongside.
Figure 21:
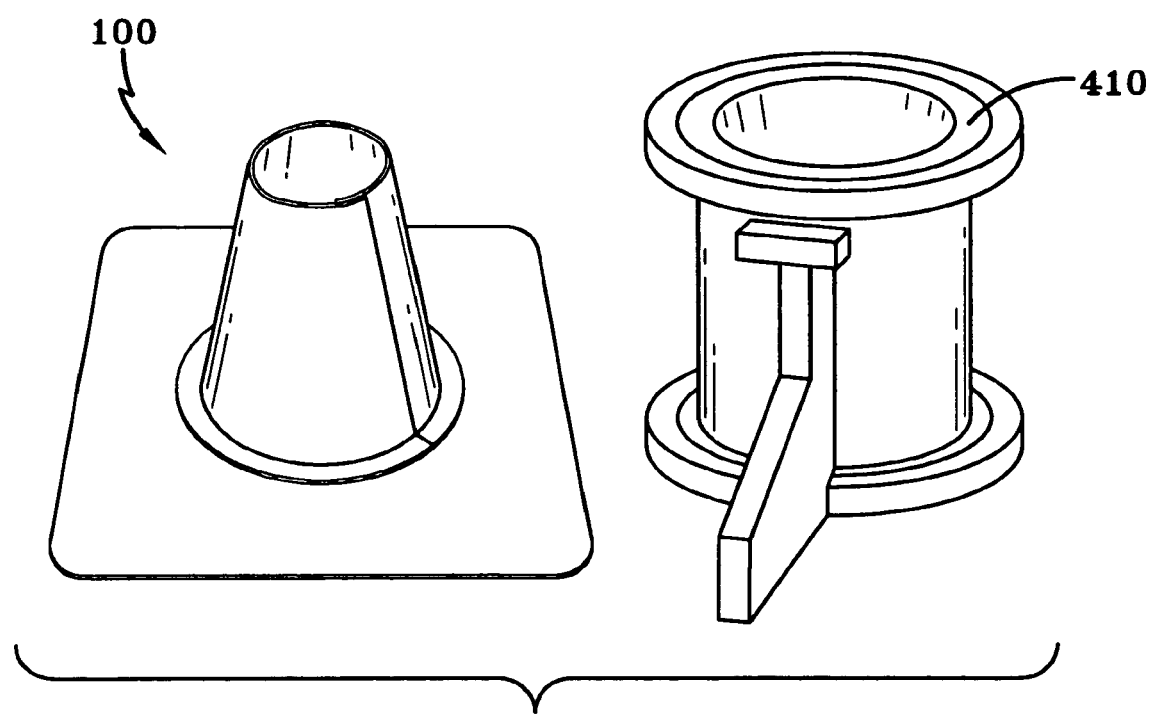
Figure 22:
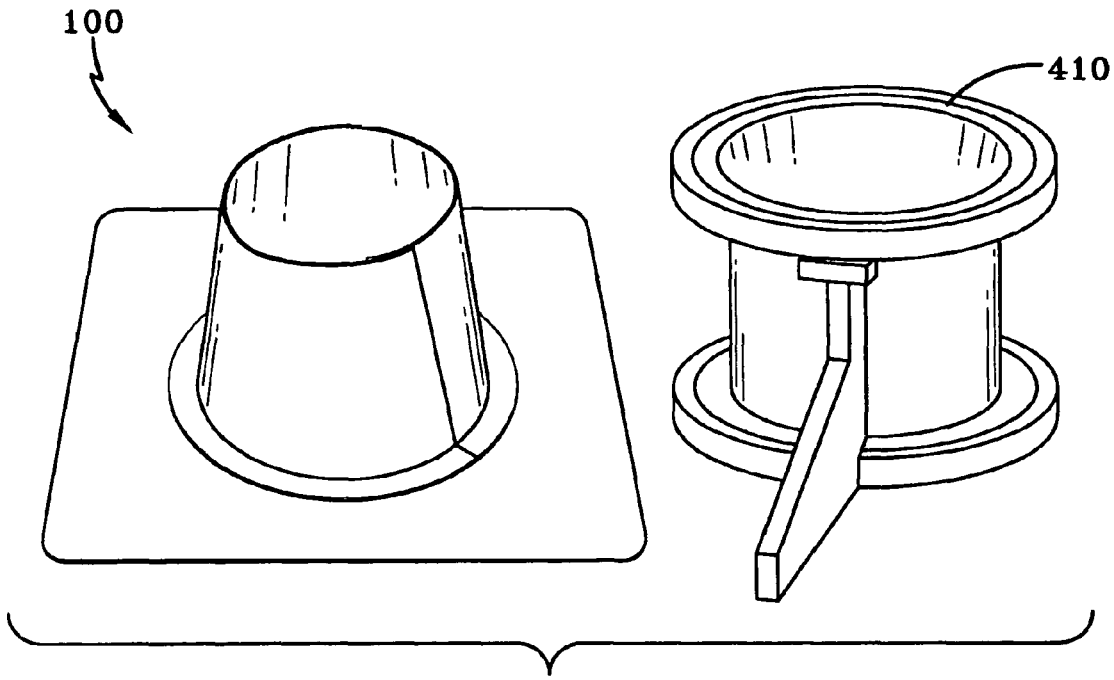
Figure 23:
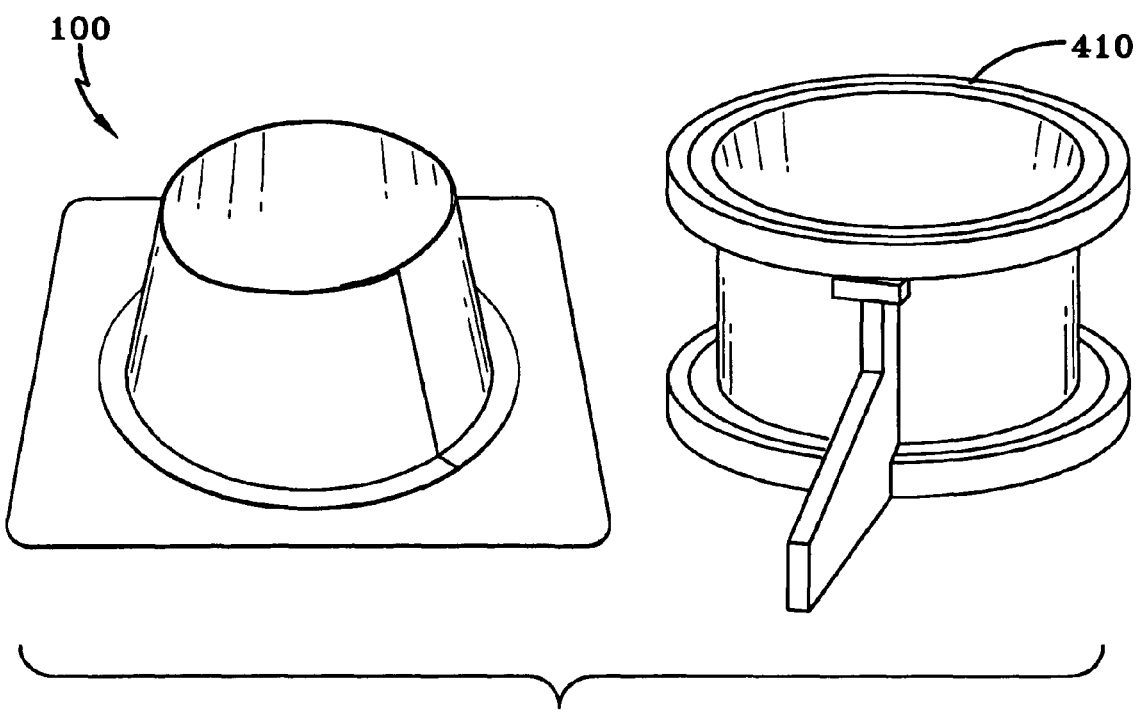
Figure 24B:
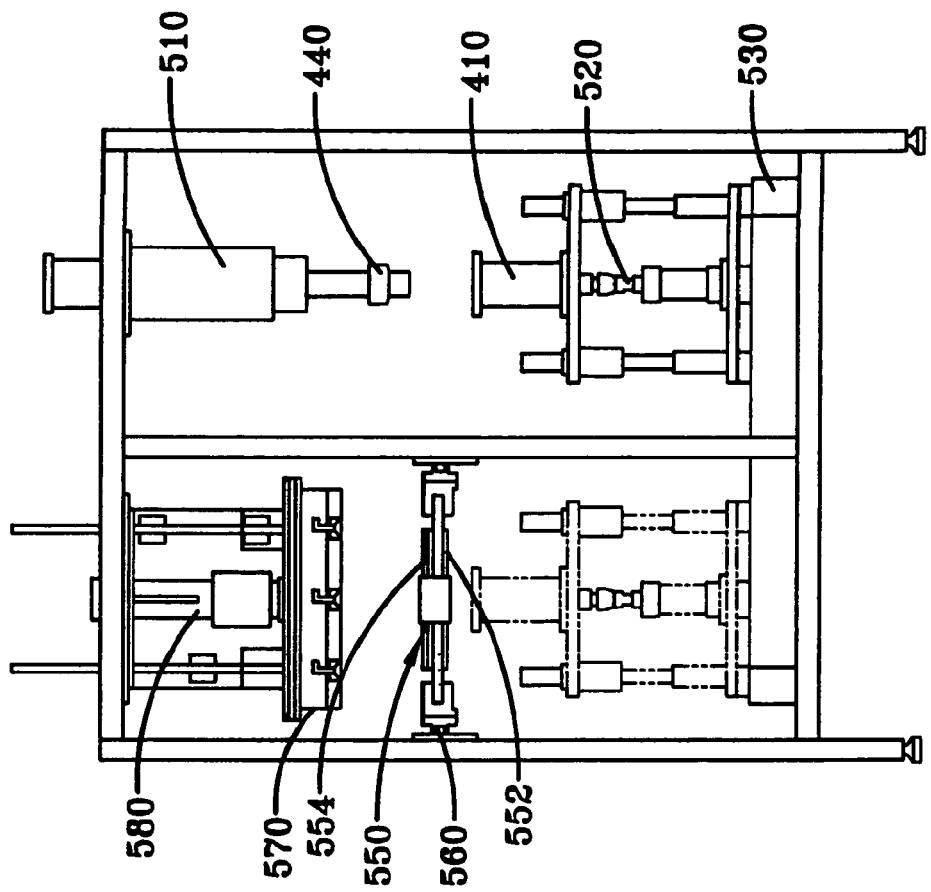
FIGS. 24a and 24b are respective side and front views of an embodiment of a device for assembling the roof fitment of the present invention.
Figure 24A:
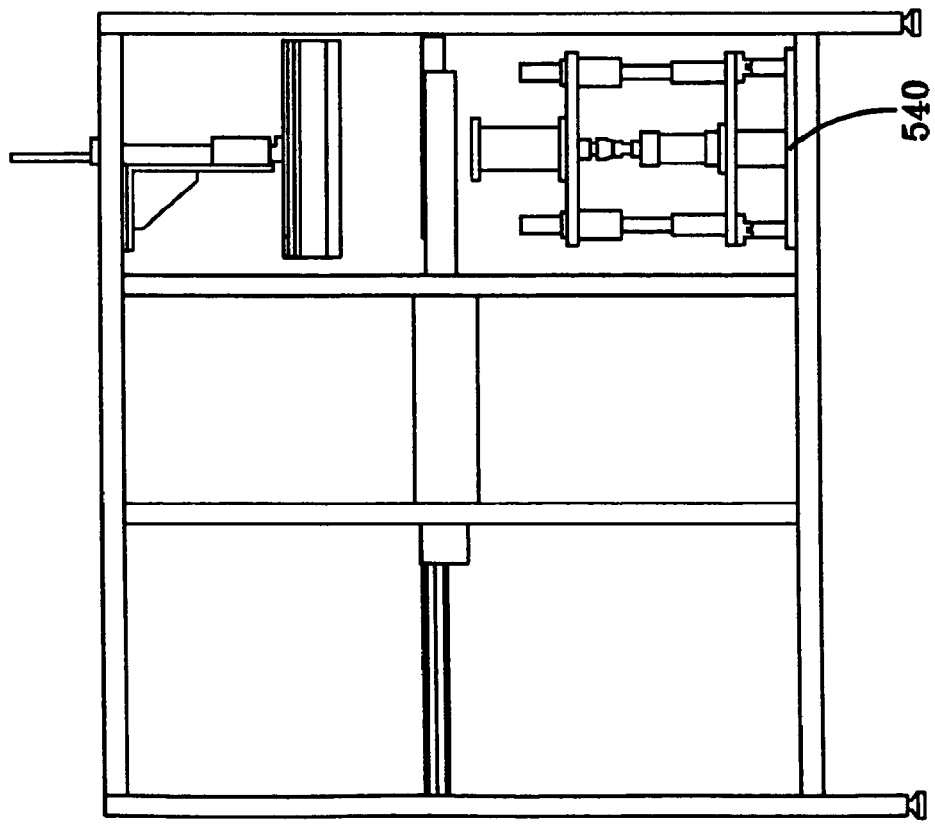

Once the protruding material 420 is heated for a sufficient amount of time, the handle 460 may be pushed downward and turned to a locking position, thereby driving the pre-shaped moveable members (e.g., pie shaped sections) 450 of the seal forming cone 440 outward, as shown in FIG. 11d. This action folds, but does not cut the protruding material 420 of the top portion 120. The folded protruding material 420 is also held between the bottom surface of the seal forming cone 440 and the top surface of the die 410, thereby forming a bottom edge 220 on the top portion 120 that may be a horizontally flat circumference. The flat, horizontal bottom edge 220 may then be allowed to cool naturally or with the addition of cool air to the area. The seal forming cone 440 and handle 460 combination may then be removed, leaving a top portion 120 having a bottom edge 220 that remains substantially horizontally flat, as shown in FIG. 11e.

FIGS. 8, 9a, 9b, 10, 11a, 12, 13a, 13b, 14a, 14b, 15a, 15b, 16a-c, 17a, 17b, 18a, 18b and 19a-e illustrate particular components of the apparatus of FIG. 7 that may used to make the horizontally flat bottom edge 220 of the top portion 120. Specifically, these components comprise a die 410, seal forming cone 440, moveable sections (i.e., pies) 450, handle 460, cap 480, lock plate 600, lock plate mount 620, heat gun and cone bracket assembly 500, outer cone 560, inner cone 540, and heat gun mount 520 with heat hood supports 590.

Conical top portions 120 of various sizes may be made by using different die sizes. FIG. 7 illustrates different die sizes that may be used for this purpose. Also, FIGS. 20-23 illustrate various sizes of dies that may be used, as well as the finished boot 100 products that correspond to each size of die.

In an exemplary embodiment of a boot of the present invention, the horizontally flat bottom edge 220 of the top portion 120 may be placed against the edge, or perimeter, of the opening 400 in the base portion 240. Next, the base portion 240 may be sealed to the bottom edge 220 of the top portion 120. In an exemplary embodiment, the base portion 240, may be a sheet of material of a predetermined size having an opening 400 corresponding to the bottom opening 200 of the top portion 120. It is preferred that the material be of a conventional composition that lends itself to heat welding. However, other forms of sealing may be used, such as but not limited to, caulking or various types of adhesives.

In embodiments shown in FIGS. 5a and 5b, the opening 400 in the base portion 240 may be aligned with the bottom opening 200 of the top portion 120. The bottom edge 220 of the top portion 120 may then be welded to the base portion 240 such that the bottom edge 220 is substantially flat and on the same plane as the base portion 240. This weld allows the base portion 240 to lay substantially flat during the welding process, obviating the need to deform the edge 405 of the base opening 400 to accomplish the weld.

In an alternative embodiment (not shown), the edge 405 of the base opening 400 may be folded upward to make a lapped engagement with the vertical portion of the top portion 120. In such case, a lap weld may be made both along the intersection of the substantially flat base portion 240 and the bottom edge 220 of the top portion 120, as well as along the intersection of the vertical top portion 120 and upwardly bent edge 405 of the base opening 400—thereby providing a strong weld.

In an exemplary embodiment, the top portion 120 may be substantially vertical with respect to the base portion 240 when the base portion 240 is in the flat horizontal position (e.g. on the roof substrate).

In yet another exemplary embodiment, the top portion 120, having a bottom edge 220 of sufficient width, may be used without a base portion 240. In this embodiment, the top portion 120 may have a bottom edge 220 of preferably one and one half inches or greater in width. However, various widths of the bottom edge 220 may be used with this embodiment. This bottom edge 220 acts as a base and may be sealed directly to the roof membrane to provide a water-tight seal around the protrusion.

In another embodiment of the present invention, illustrated in FIG. 6, the boot (or flashing) 102 may be an open design. In other words, there may be a break 800 in the top (or vertical) portion 122 of the boot 102. The base portion 242 of the boot 102 may also have a break 810 (break 810 meets the break 800 in the top portion 122) so that the boot 102 may be opened to accept an existing vertical protrusion on the roof.

As illustrated in FIG. 6, the break 810 in the base portion 242 separates a first portion 244 of the base portion 242 from a second portion 246 of the base portion 242. The break 800 in the top portion 122 separates a first portion 124 of the top portion 122 from a second portion 126 of the top portion 122.

In an exemplary embodiment of the open stack boot 102, the break 810 in the base portion 242 is aligned with the break 800 in the top portion 122. The breaks 800, 810 in the boot 102 allow the boot 102 to be opened to accept a protrusion on the roof to be covered. After wrapping the protrusion, the top and base portions 122, 242 may be welded along the breaks 800, 810 to complete the seal.

The boot 102 of the open stack embodiment may also have a base flap 128 which may be used to seal together the first portion 244 and the second portion 246 of the base portion 242. In one embodiment, the base flap 128 is part of an overlap portion 124a that is used to bond or weld the first portion 124 and the second portion 126 of the top portion 122 together. In an alternative embodiment, the base flap 128 may be connected to another portion of the boot 102 (e.g., base or non-overlapping portion). It is appreciated that there may be different size stacks for the various size pipes.

The boot 100 of the present invention may be installed by placing the bottom opening 200 of the top portion 120 and the base opening 400 of the base portion 240 over the protrusion (e.g. pipe) to be covered. The top opening 180 of the top portion 120 should not be higher than the top of the protrusion. The base portion 240 may be flat over the roof. Next, the top portion of the side edge 360 (e.g. the flap portion 270) of the vertical top portion 120 may be pulled around the protrusion so that the top opening 180 is adjusted to fit the diameter of the protrusion. The top opening 180 of the top portion 120 may then be sealed around the protrusion. In an exemplary embodiment, the top portion of the side edge (e.g. the flap portion 270) may be heat sealed or welded to the corresponding top portion of the other side edge 340, on site. The base portion 240 may then be heat sealed or welded to the underlying roofing membrane to provide a water-tight seal around the protrusion.

The boot 102 of the present invention which has an open design (open stack) may be installed by opening the boot 102 along the breaks 800, 810. The first portions 244, 124 of the base portion 242 and the top portion 122 may be pulled around the protrusion and sealed to the second portions 246, 126 of the base portion 242 and top portion 122, respectively. Specifically, the first portion 124 of the top portion 122 may be sealed to the second portion 126 of the top portion 122, while the first portion 244 of the base portion 242 may be sealed to the second portion 246 of the base portion 242 after it is pulled around the protrusion. Then the boot 102 may be sealed to the roof membrane as described above.

In an alternate embodiment, a top portion 120, having a bottom edge 220 of sufficient width, may be used without a base portion 240. In this embodiment, the top portion 120 may be installed by placing the bottom opening 200 of the top portion 120 over the protrusion (e.g. pipe) to be covered. The top opening 180 of the top portion 120 should not be higher than the top of the protrusion. Next, the top portion of the side edge 360 (e.g. the flap portion 270) of the vertical top portion 120 may be pulled around the protrusion so that the top opening 180 may be adjusted to fit the diameter of the protrusion. The top opening 180 of the top portion 120 may then be sealed around the protrusion. The bottom edge 220 of the top portion 120, may act as a base and then be heat sealed or welded directly to the underlying roofing membrane to provide a water-tight seal around the protrusion. In this exemplary embodiment, the bottom edge 220 of the top portion 120 may be about one and one half inches or greater in width. However, various widths of this bottom edge 220 may accomplish a seal with the underlying roof membrane without a base portion 240.

FIGS. 24a, 24b, 25a-c, 26a-d and 27 illustrate an example embodiment of the device for assembling the roof fitment of the present invention. The device includes a seal forming cone 440 positioned by a vertically movable arm 510 over the top of a die 410 appropriately sized to accommodate the top portion 120 of a boot 100 to be formed.

The top portion 120 is placed in the die 410 so that the bottom opening 200 is facing up toward the seal forming cone 440. The arm 510 moves down, allowing the seal forming cone 440 to enter the bottom opening 200 and cold form the bottom edge 220 of the top portion 120.

One example embodiment of the present invention includes a vacuum source connected to the complementary edge of the die 410 where the cold formed bottom edge 220 is formed by the insertion of the seal forming cone 440 and the movable sections (pies) 450 to form the flattened bottom edge 220 of the top portion 120. In this example embodiment, the vacuum along the complementary edge assists the positioning of the bottom edge 220 in preparation for sealing at least a portion of the edge 220 to at least a portion of the base portion 240 in the vicinity of the opening 400 in the base.

The seal forming cone 440 is retracted by movement of the movable arm 510 from the top portion 120 now having the cold formed bottom edge 220. The die 410 then moves to a second position on its movable arm 520 on a sliding assembly 530 moving along a guide rail 540 on the machine frame.

The die 410 is then positioned under a heat conductive plate 550 mounted on a support rail 560 to the machine frame. Next, the die 410 holding the top portion 120 having the bottom edge 220 is raised by the movable arm 520 up to a side 552 of the heat conductive plate 550. On the opposite side 554 of the heat conductive plate 550, a vacuum plate 570 holding a base portion 240 is lowered by a movable arm 580 to its respective side 554 of the heat conductive plate 550. The top portion 120 and the base portion 240 are then heated for a time sufficient to allow the welding of at least a portion of the top portion 120 to at least a portion of the base portion 240.

After a sufficient period of heating, the arms 520 and 580 retract slightly away from the heat conductive plate 550 to allow the heat conductive plate to move away on the support rails 560 from between the top potion 120 in the die 410 and the base portion 240 on the vacuum plate 570.

The arms 520 and 580 then extend again to place at least a portion of the top portion 120 and the base portion 240 together to allow the heated portions to seal together to form the finished boot 100.

After sufficient time to allow for the bonding of the top portion 120 to the base portion 240, the arms 520 and 580 retract sufficiently to allow removal of the finished boot 100 from the device of the present invention. The die 410 can then be repositioned for the initiation of the assembly process for the next boot 100 to be made.

Figure 25A:
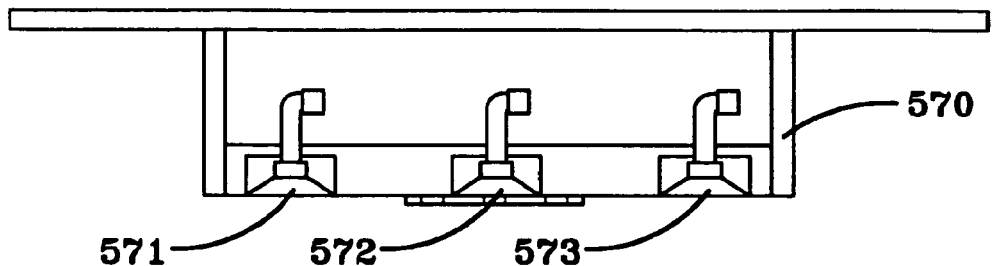
FIGS. 25a through 25c are views of embodiments of a vacuum plate of an upper fixture of a device for assembling the roof fitment of the present invention.
Figure 25B:
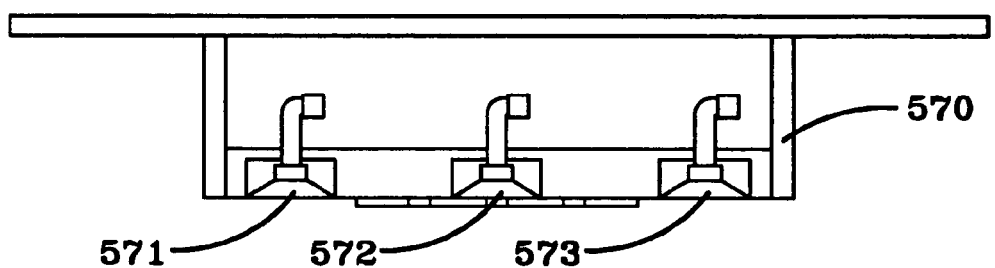
Figure 25C:
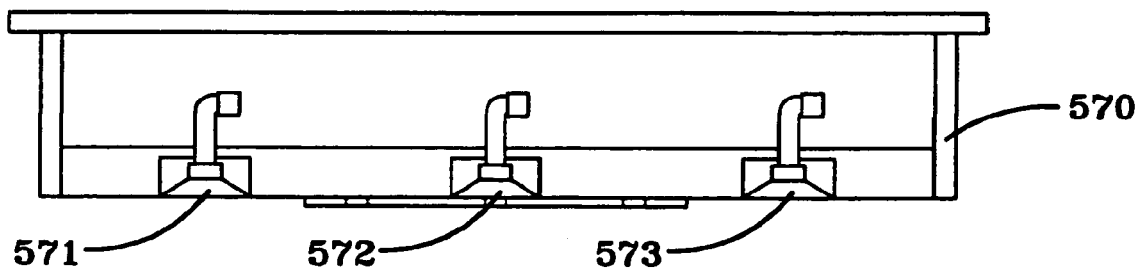
Figure 27:
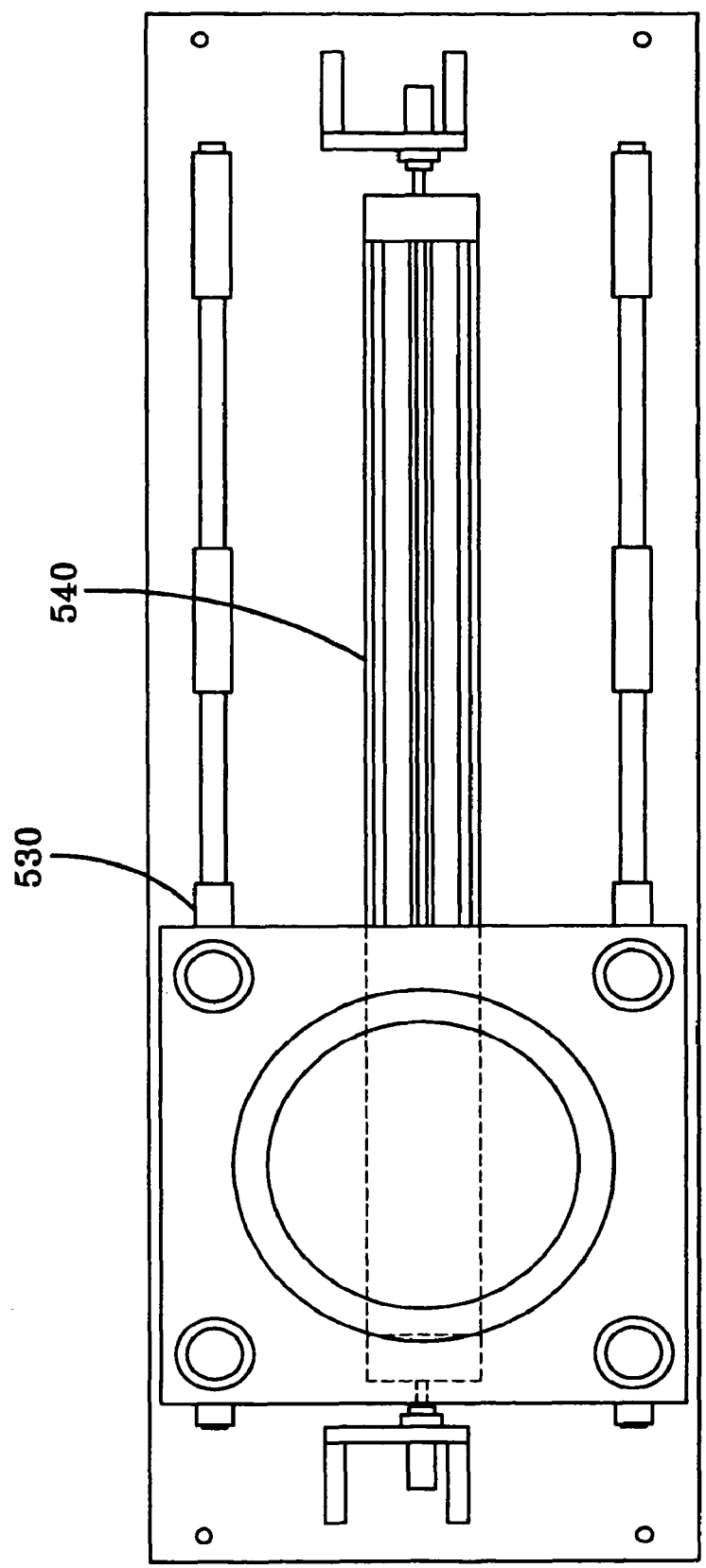
FIG. 27 is a top view of a transfer assembly of a device for assembling the roof fitment of the present invention.

As shown in FIGS. 25a-c, the vacuum plate 570 may have different sizes, different spatial arrangements, and/or have multiple vacuum points such as are shown at 571, 572, and 573 to accommodate different sized base portions 240.

In addition, the seal forming cone 440 can accommodate different sized lock plates 600, lock plate mounts 620, caps 480, and movable sections 450 to allow different sized and shaped top portions 120 to be formed by inserting the seal forming cone 440 into a die 410.

The present invention provides for different sequences of movement by the movable arms 510, 520, and 580. In some embodiments, an arm or arms may not be required to move in order to form the boots 100 of the present invention. For example, the seal forming cone 440 may remain stationary as the die 410 is raised by arm 520 to insert the cone 440 in the die 410. Additionally, the die 410 holding the formed top portion 120 having the bottom edge 220 may rise on arm 520 to contact the bottom opening 200 in the base portion 240 held by a stationary vacuum plate 570. Then by application of an appropriate amount of force between the vacuum plate 570 and the die 410, the top portion 120 can be sealed to at least a portion of the base portion 240.

Another embodiment of the present invention allows for the arms 510, 520, 580 to have positioning capability sufficient to allow adjustment to insure the proper alignment of an opening 400 in a base portion 240 with the bottom opening 200 in the top portion 120.

As shown in FIG. 26*a*-*d*, another embodiment of the present invention allows for the heat conductive plate 550 to have the capability to hold appropriately sized heating elements as are shown at 551, 553, 555, and 557, respectively, in order to match the desired portion and or size of a top portion 120 and a base portion 240 to be welded together to make a finished boot 100.

In order to hot air bond the top portion 120, various devices may be used. A preferred device to hot air bond the top portion 120 is shown in FIGS. 28-33. This bonding device 600 may include a securing arm 630, an L-shaped arm 625, a press 620, a heat source 610 and a nozzle 615. One end of the L-shaped arm 625 may be attached to the securing arm 630, while the other end of the L-shaped arm 625 contains a press 620. The L-shaped arm 625 may be attached to the securing arm 630 in such a way that the press 620 may be substantially above the securing arm 630. A heat source 610, having a nozzle 615, may preferably be beside and on substantially the same plane as the securing arm 630.

Figure 28:
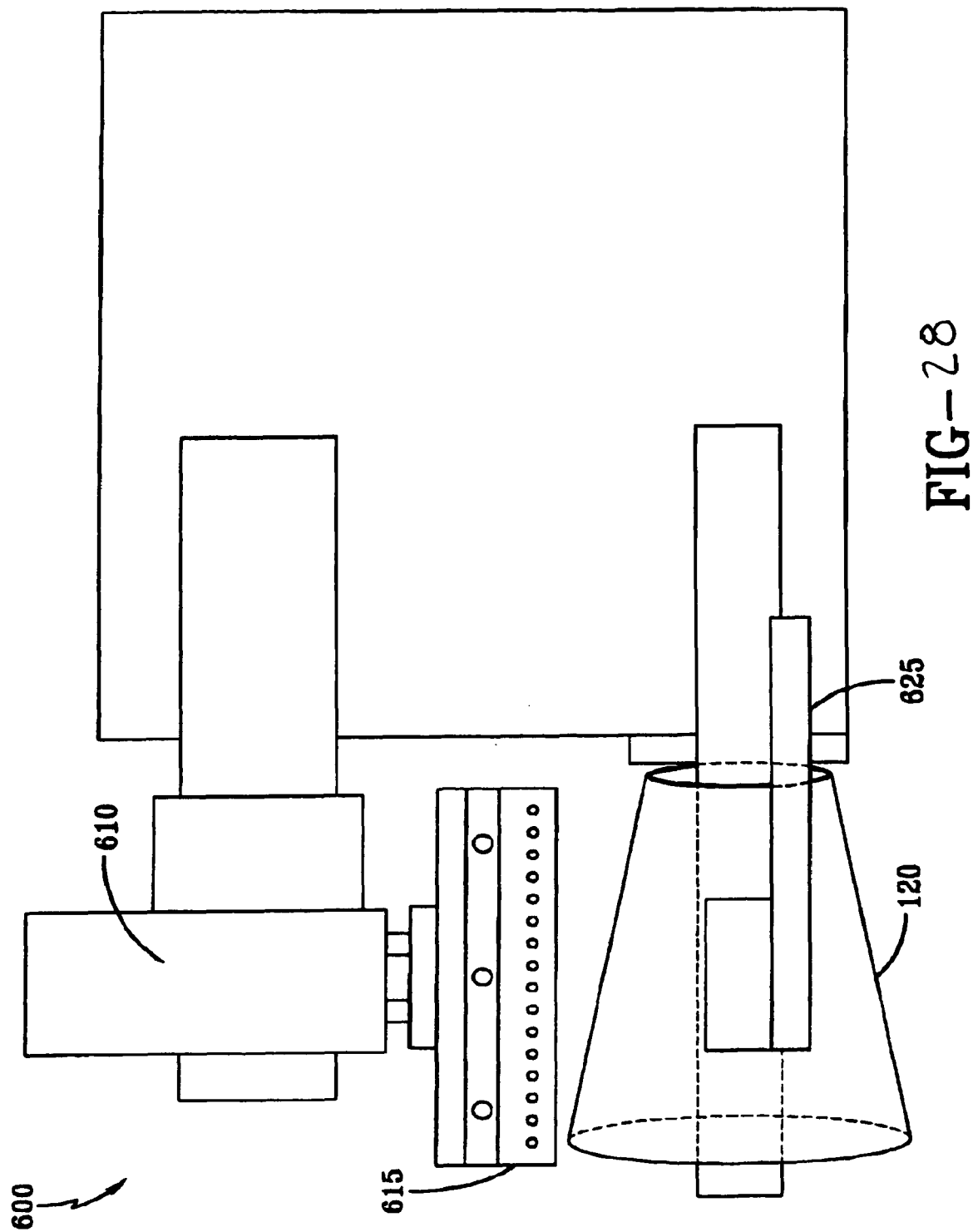
FIG. 28 is a top view of a device used to form a hot air bond in the conate member of the present invention.
Figure 29:
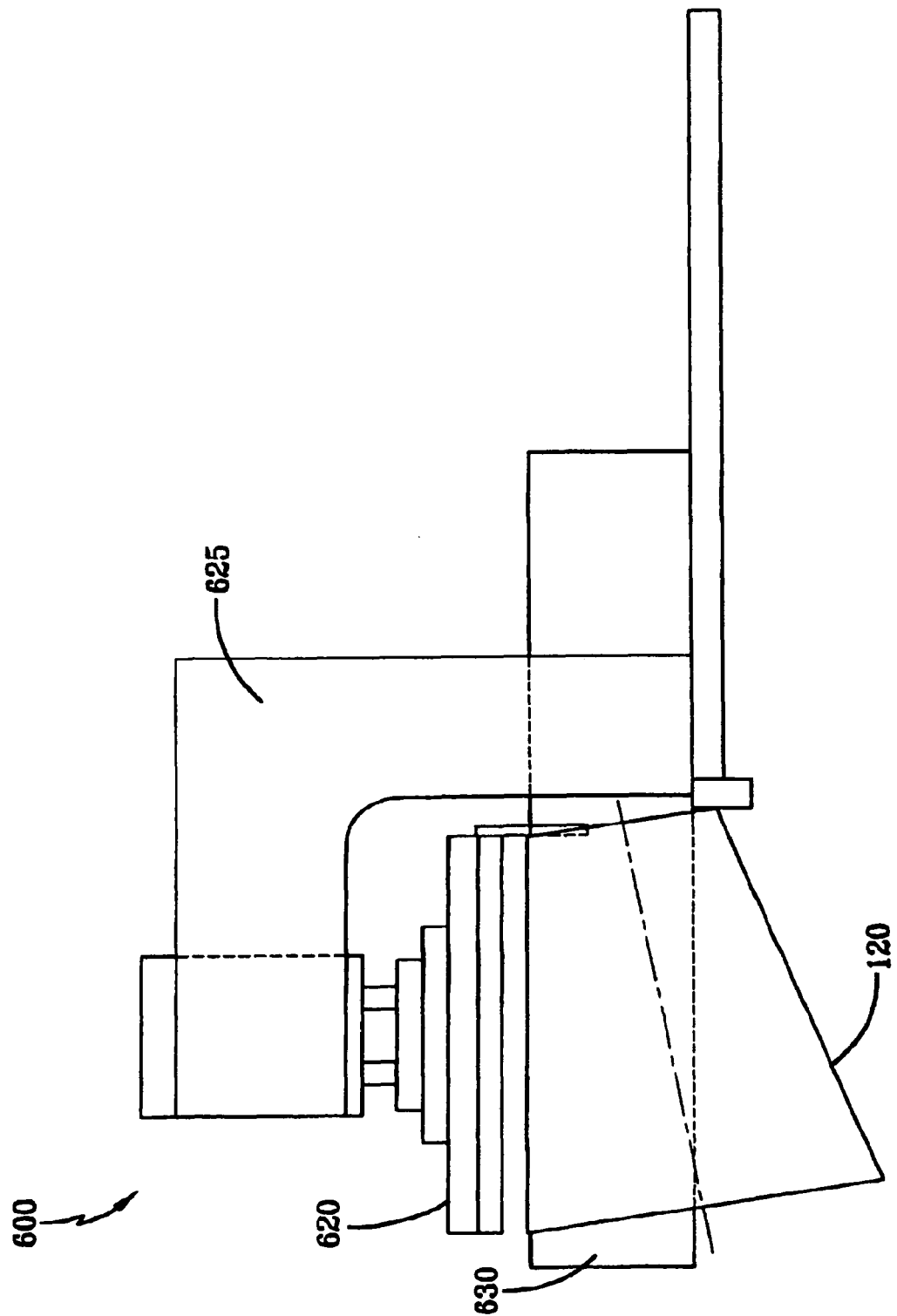
FIG. 29 is an end view of the device of FIG. 28.
Figure 30:
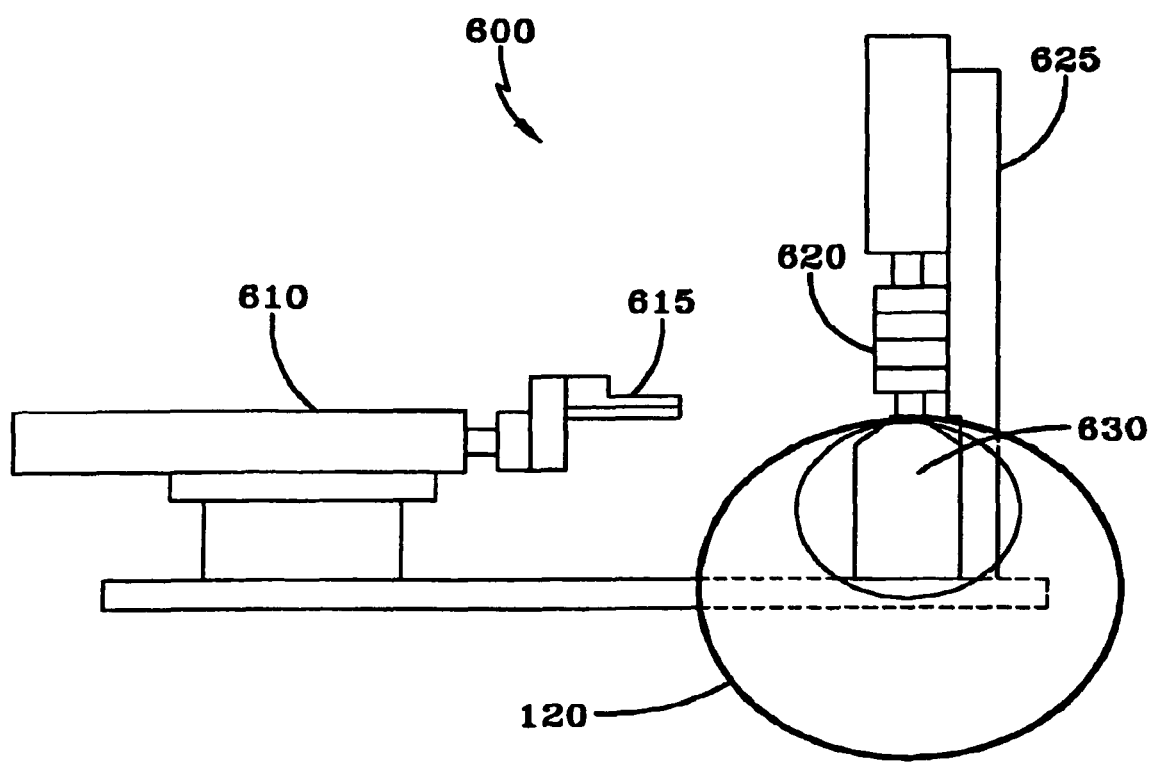
FIG. 30 is a side view of the device of FIG. 28.

In order to hot air bond an unassembled top portion 120, a first side edge 340 of the unassembled top portion 120 may be attached to the securing arm 630, as shown in FIGS. 28-30. The second side edge 360 of the unassembled top portion 320 may be wrapped around the securing arm 630 until the second side edge 360 is substantially overlapping the first side edge 340, creating a cone or cylinder shape. The second side edge 360 may be held in place by a vacuum so that the second side edge 360 may be about one-half of an inch above the first side edge 340. The nozzle 615 of the heat source 610 may then be inserted in between the space between the first side edge 340 and the second side edge 360. Hot air may then be emitted from the heat source 610 via the nozzle 615 for a sufficient amount of time.

The nozzle 615 and heat source 610 may then be retracted to its original position. The press 620 may then be lowered, pressing the second side edge 360 and the first side edge 340 together until the bond is formed. Once the bond is formed, the press 620 may retract, thereby leaving an assembled top portion, which serves as the conate member.

Figure 31:
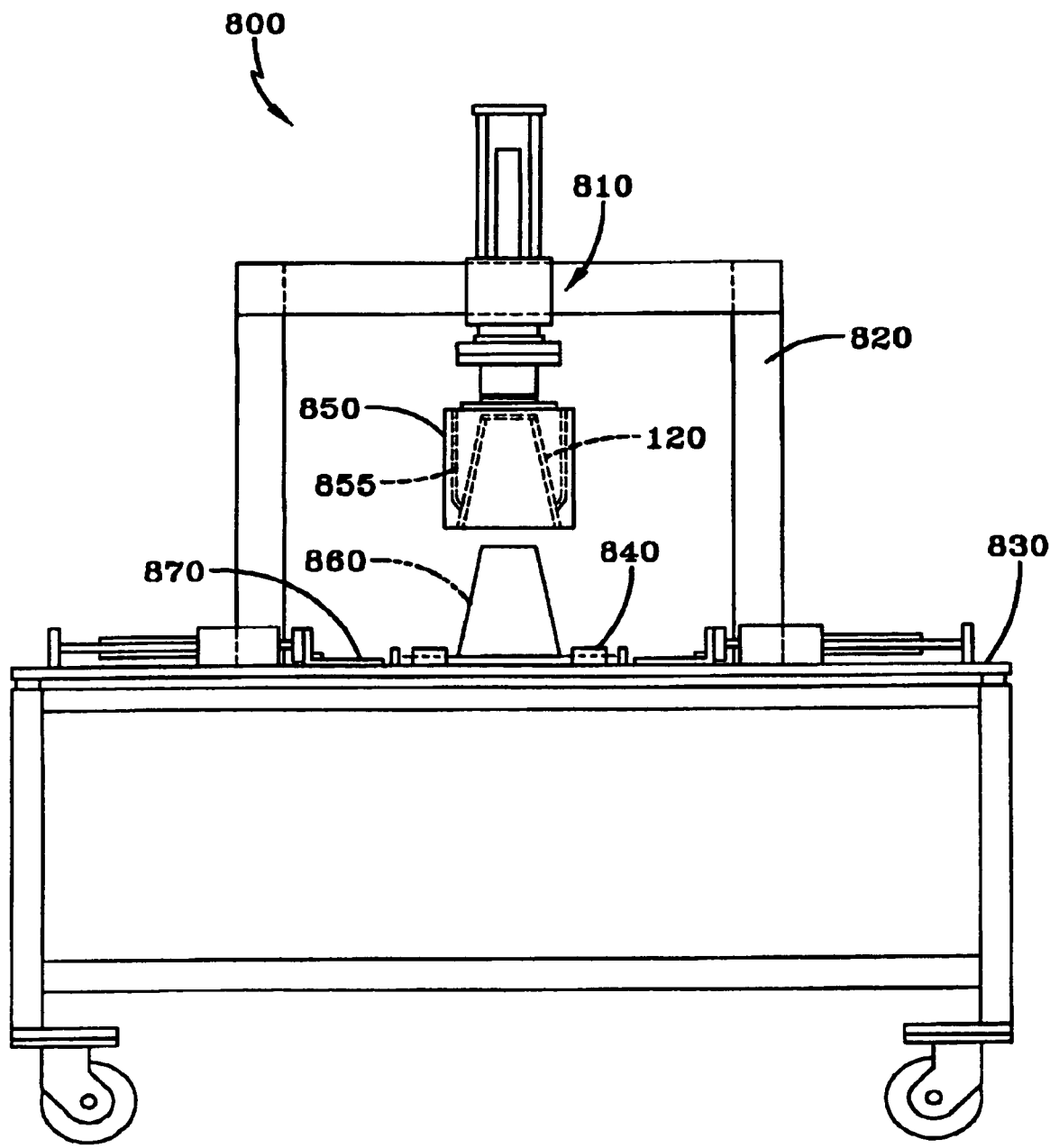
FIG. 31 is a side view of a device used to form a hot air bond between a conate member of the present invention with a base member.
Figure 33:
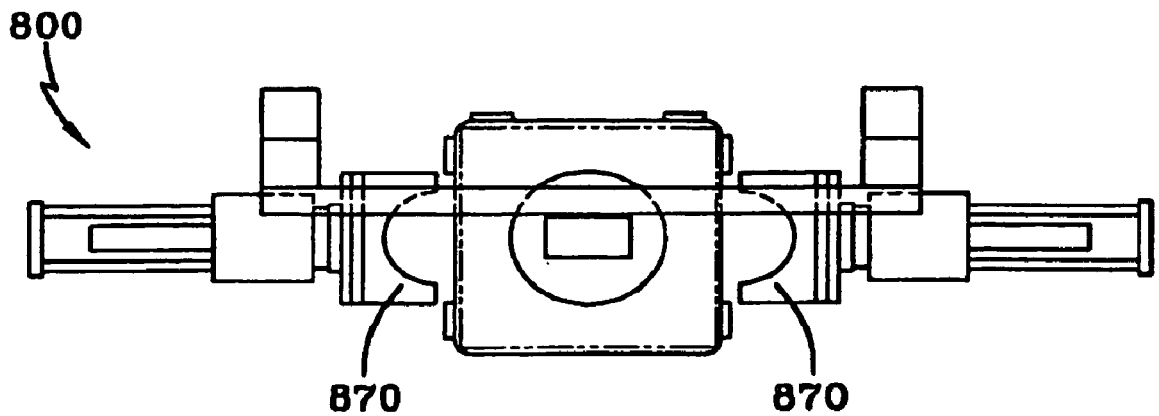
FIG. 33 is a top view of the device of FIG. 31.
Figure 32:
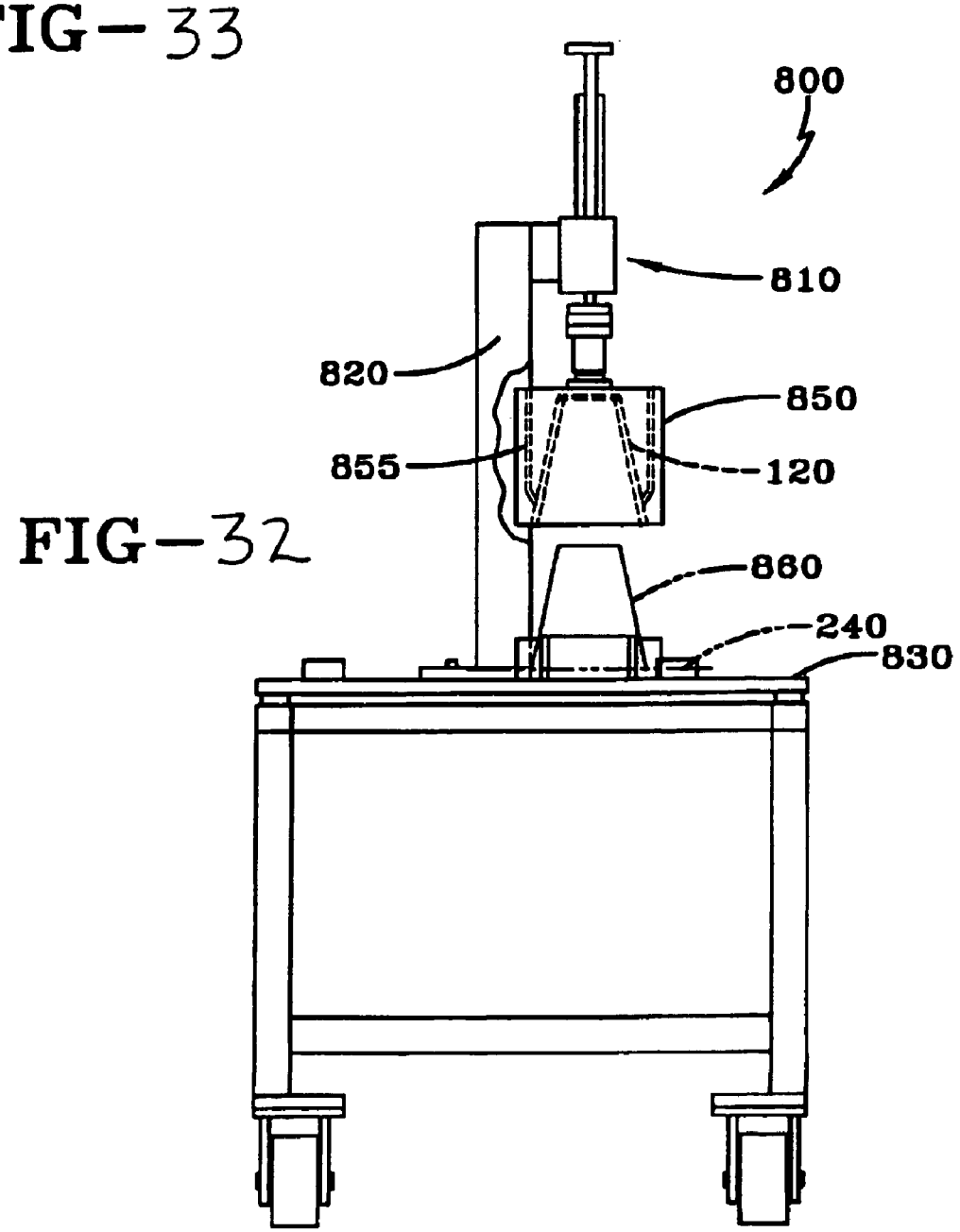
FIG. 32 is a end view of the device of FIG. 31.

One way to hot air bond the bottom edge 220 of the top portion 120 to the base portion 240 is by placing these components into a second hot air bonding machine 800, as shown in FIGS. 31-33. This hot air bonding machine 800 may have a lower portion 830 and a top support 820 that may be substantially U-shaped. The lower portion 830 may be substantially flat and have at least one clamp 840 to hold the base member 240 of the boot 100 in place. The U-shaped support 820 may have an extendable vertical arm 810 attached thereto. The lower end of the vertical arm 810 may have a holding chamber 850. The holding chamber 850 may hold a top portion 120 of the boot 100 and the holding chamber 850 may be of any size and shape that is suitable for holding a top portion 120. The holding chamber 850 may preferably hold the top portion 120 inside by vacuuming action through vacuum tubes 855 on the holding chamber 850. The reverse may also be accomplished such that the base portion is held by vacuum while the top portion is raised or lowered into the base.

The holding chamber 850 may be lowered until it is just above the base member 240 residing on the lower portion 830 of the hot air bonding machine 800. In a preferred embodiment, the holding chamber 850 will lower the conate member 120 until it is about one-half of an inch above the base member 240. A male die 860 may be provided on the lower portion 830 of the hot air bonding machine 800, for receiving the conate member 120 as it is lowered by the holding chamber 850. A heat source with an applicator may then be inserted between the conate member 120 and the base member 240. The bottom edge 220 of the conate member 120 and the base member 240 may be heated for a sufficient amount of time to prepare each for bonding.

One exemplary application apparatus for hot air bonding the bottom edge 220 of conate member 120 and base member 240 is shown in FIG. 33. At least one heat sources (not shown) may be provided to supply hot air for bonding the conate and base members 120, 240. Hot air is preferably applied to the conate and base members 120, 240 via a pair of extendable and, preferably, semi-circular shaped applicators 870, which are simultaneously extended inward to reside between the base member 240 and conate member 120. The semi-circular shaped applicators 870 preferably have openings (not shown) on both the top face and lower face so that hot air may simultaneously be emitted upwardly toward the bottom edge 220 of the conate member 120, and downwardly toward the base member 240. Once hot air is emitted for a sufficient amount of time, the semi-circular shaped applicators 870 may retract to their original position. Holding chamber 850 may then release the conate member 120, and the bottom edge 220 thereof and base member 240 will be firmly held together until a hot air bond is formed.

Another exemplary method and apparatus for forming a hot air bond between the bottom edge 220 of conate member 120 and the base member 240 may be by a turntable and roller apparatus. Specifically, the lower portion 830 of the hot air bonding machine 800 may contain a turntable section on which the base portion 240 is placed. A conate member 120 in the holding chamber 850 is lowered to preferably about one-half of an inch above the base member 240, as described above. The turntable section and holding chamber 850 preferably rotate at the same rate. A retractable heat source and roller mechanism may be inserted to hot air bond the bottom edge 220 of the top portion 120 and the base portion 240 together.

The retractable heat source may be comprised of a narrow heating applicator which may be inserted in between the bottom edge 220 of the conate member 120 and the base member 240 as they are rotating. A roller may be located beside the narrow heating applicator so that the roller follows the narrow heating applicator as the conate member 120 and base member 240 are rotating. While the narrow heating applicator is inserted in between the bottom edge 220 and the base member 240, thereby heating both simultaneously, the roller may be simultaneously inserted above the bottom edge 220 so that the roller presses the bottom edge 220 against the base member 240, thereby forming a hot air bond as they rotate.

It is noted that in both applications of hot air bonding a bottom edge 220 of a conate member 120 to a base member 240, the conate member 120 may be located below the lower portion 830 of the hot air bonding machine 800, and the conate member 120 may be raised through the opening 400 in the base member 240. This enables a hot air bond to be formed with the base member 240 overlapping the bottom edge 220 of the conate member 120.

The boots described above allow for easier and more cost-effective manufacture and installation and also allow for the water-tight sealing of pipes of various diameters.

The boots described above may be made of various materials including, but not limited to, thermoplastic materials such as poly(vinyl chloride) (PVC), and thermoplastic polyolefin (TPO). Additionally, various methods of sealing the material may be used. These methods included, but are not limited to welding, hot air bonding, caulking or the use of various types of adhesives or glues.

The present invention is adaptable to be made from any flexible material, particularly those materials known by those skilled in the art as flexible materials that may be used for a roofing membrane. In addition to PVC and TPO material, the material may be comprised of a rubber. In addition, the materials include bondable materials. The types of bonds suitable for use with such material include heat bonds, adhesive or glue bonds, and solvent bonds.

When the assembly method or device described above uses an attachment mode other than hot air bonding and dielectric welding, such as caulking or adhesives, PVC, TPO and other suitable material may be used. In addition to dielectric welding and hot air bonding, other methods of attachment include solvent fusion, adhesive bonds, heat welding, melted welding, vibration welding, ultrasonic welding, and heat staking.

What is claimed is:

1. A device for forming a radial flange on an opening of a conate member, comprising:
    a die having an open end and a flange surrounding the open end, said die is adapted to receive the conate member where at least a portion of the conate member opening extends above the open end of the die;
    a seal-forming cone having a central axis and at least two radially-extendable sections and being removably located in the open end of the die, where the conate member is interposed between the seal-forming cone and the die; and
    a handle, axially movable in the seal-forming cone to extend the extendable sections along the flange of the die so that the portion of the conate member which extends above the open end of the die is interposed between the extendable sections of the seal-forming cone and the flange of the die.

2. The device of claim 1, wherein:
    the extendable sections are sectors of a circle.

3. The device of claim 1, further comprising:
    a heating mechanism having a heat source adapted to supply heat to the portion of the conate member which extends above the open end of the die.

4. The device of claim 3, wherein the heating mechanism further comprises:
    a channel for transporting heated air;
    a heat gun mount, located above the channel and communicated with the heat source to direct hot air through the channel; and
    at least one support for positioning the heat gun mount on top of and above the die.

5. The device of claim 3, wherein the heating mechanism further comprises:
    a circular member having a continuous channel;
    a hollow joint member positioned above the die; and
    at least one hollow arm interposed between the circular member and the hollow joint member for transporting heated air.

6. The device of claim 5, wherein the circular member is fitted around the portion of the conate member which extends above the open end of the die.

7. The device of claim 5 wherein the heat source is located within the hollow joint member.

8. The device of claim 7, wherein the heat source directs heated air through the hollow joint member and the at least one hollow arm to the circular member.

9. A device for forming a conate member having a radial flange attached thereto from a sheet having side edges, comprising:
    a securing arm adapted to secure the side edges of the sheet in an overlapping configuration;
    a nozzle in communication with a source of hot air and adapted to direct hot air onto the overlapping side edges of the sheet;
    a pressing element which forces the overlapping side edges together to form a conate member;
    a die having an open end and a flange surrounding the open end, said die is adapted to receive the conate member where at least a portion of the conate member opening extends above the open end of the die;
    a seal-forming cone having a central axis and at least two radially-extendable sections and being removably located in the open end of the die, where the conate member is interposed between the seal-forming cone and the die; and
    a handle, axially movable in the seal-forming cone to extend the extendable sections along the flange of the die so that the portion of the conate member which extends above the open end of the die is interposed between the extendable sections of the seal-forming cone and the flange of the die.

10. The device of claim 9, wherein:
    the extendable sections are sectors of a circle.

11. The device of claim 9, further comprising:
    a heating mechanism having a heat source adapted to supply heat to the portion of the conate member which extends above the open end of the die.

12. The device of claim 11, wherein the heating mechanism further comprises:
    a channel for transporting heated air;
    a heat gun mount, located above the channel and communicated with the heat source to direct hot air through the channel; and
    at least one support for positioning the heat gun mount on top of and above the die.

13. The device of claim 12, wherein the heating mechanism further comprises:
    a circular member having a continuous channel;
    a hollow joint member positioned above the die; and pg,25
    at least one hollow arm interposed between the circular member and the hollow joint member for transporting heated air.

14. The device of claim 13, wherein the circular member is fitted around the portion of the conate member which extends above the open end of the die.

15. A device for forming a conate member having a radial flange attached thereto from a sheet having side edges, comprising:
    a securing arm;
    a vacuum device attached to the securing arm adapted to secure at least one of the side edges of the sheet in an overlapping configuration;
    a nozzle in communication with a source of hot air and adapted to direct hot air onto the overlapping side edges of the sheet;
    a pressing element which forces the overlapping side edges together to form a conate member;

a die having an open end and a flange surrounding the open end, said die is adapted to receive the conate member where at least a portion of the conate member opening extends above the open end of the die;

a circular heating device adapted to supply heat to the portion of the conate member which extends above the open end of the die;

a seal-forming cone having a central axis and at least two radially-extendable sections and being removably located in the open end of the die, where the conate member is interposed between the seal-forming cone and the die; and a handle, axially movable in the seal-forming cone to extend the extendable sections along the flange of the die so that the portion of the conate member which extends above the open end of the die is interposed between the extendable sections of the seal-forming cone and the flange of the die.

16. The device of claim 15 wherein:

the circular heating device comprises a plurality of hot air nozzles in communication with a hot air source.

17. The device of claim 15, wherein:

the extendable sections are sectors of a circle.

* * * * *